United States Patent [19]

Kessler et al.

[11] Patent Number: 5,432,421

[45] Date of Patent: Jul. 11, 1995

[54] PROCESS FOR DETECTING THE POSITION, DIRECTION OF MOVEMENT AND DYNAMIC CHARACTERISTIC VALUES OF REMOTE-CONTROLLED DISPLACEMENT OF AN ADJUSTABLE OBJECT

[75] Inventors: Michael Kessler, Offenbach; Klaus Wagner, Gleussen; Herbert Becker, Coburg; Roland Kalb, Rossach; Jürgen Seeberger, Rattelsdorf, all of Germany

[73] Assignee: Brose Fahrzeugteile GmbH & Co. KG, Coburg, Germany

[21] Appl. No.: 965,966

[22] Filed: Oct. 26, 1992

[30] Foreign Application Priority Data

Oct. 26, 1991 [DE] Germany .................. 41 35 873
Aug. 29, 1992 [DE] Germany .................. 42 29 045

[51] Int. Cl.[6] .................. G01D 5/244; G01B 7/00; G01P 13/00; H02K 13/00
[52] U.S. Cl. .................. 318/538; 318/491; 318/244; 318/558
[58] Field of Search .............. 318/560, 618, 652, 653, 318/138, 244, 245, 246, 249, 250, 254, 459, 463, 464, 491, 494, 519, 538, 541, 542, 558

[56] References Cited

U.S. PATENT DOCUMENTS

| 3,663,877 | 5/1972 | Clark | 318/254 |
|---|---|---|---|
| 3,679,953 | 7/1972 | Bedford | 318/138 |
| 3,760,392 | 9/1973 | Stich | 318/254 X |
| 3,889,169 | 6/1975 | Hirschman et al. | 318/571 |
| 3,895,273 | 7/1975 | Parker | 318/138 |
| 4,228,396 | 10/1980 | Palombo et al. | 318/272 X |
| 4,454,460 | 6/1984 | Tahara et al. | 318/491 |
| 4,479,079 | 10/1984 | Hanner | 318/541 X |
| 4,501,997 | 2/1985 | Müller | 318/254 |
| 4,527,101 | 7/1985 | Zavis et al. | 318/245 |
| 4,639,884 | 1/1987 | Sagues | 318/603 |
| 4,744,041 | 5/1988 | Strunk et al. | 318/245 X |
| 4,760,318 | 7/1988 | Jones | 318/362 |
| 4,862,045 | 8/1989 | Gleim et al. | 318/254 |
| 4,940,912 | 7/1990 | Kant et al. | 310/162 |

Primary Examiner—Bentsu Ro
Attorney, Agent, or Firm—Christie, Parker & Hale

[57] ABSTRACT

The invention relates to a process for detecting the position and direction of movement and for detecting the dynamic characteristic values of remote-controlled displacements of an adjustable object. According to the invention a signal is detected and evaluated which is solely made up of a system-characteristic signal or the overlapping of several system-characteristic signals. The aim is to achieve a high dissolution of the aforesaid values which are to be detected without using additional sensor or transmitter elements whilst incurring only small production costs.

39 Claims, 31 Drawing Sheets

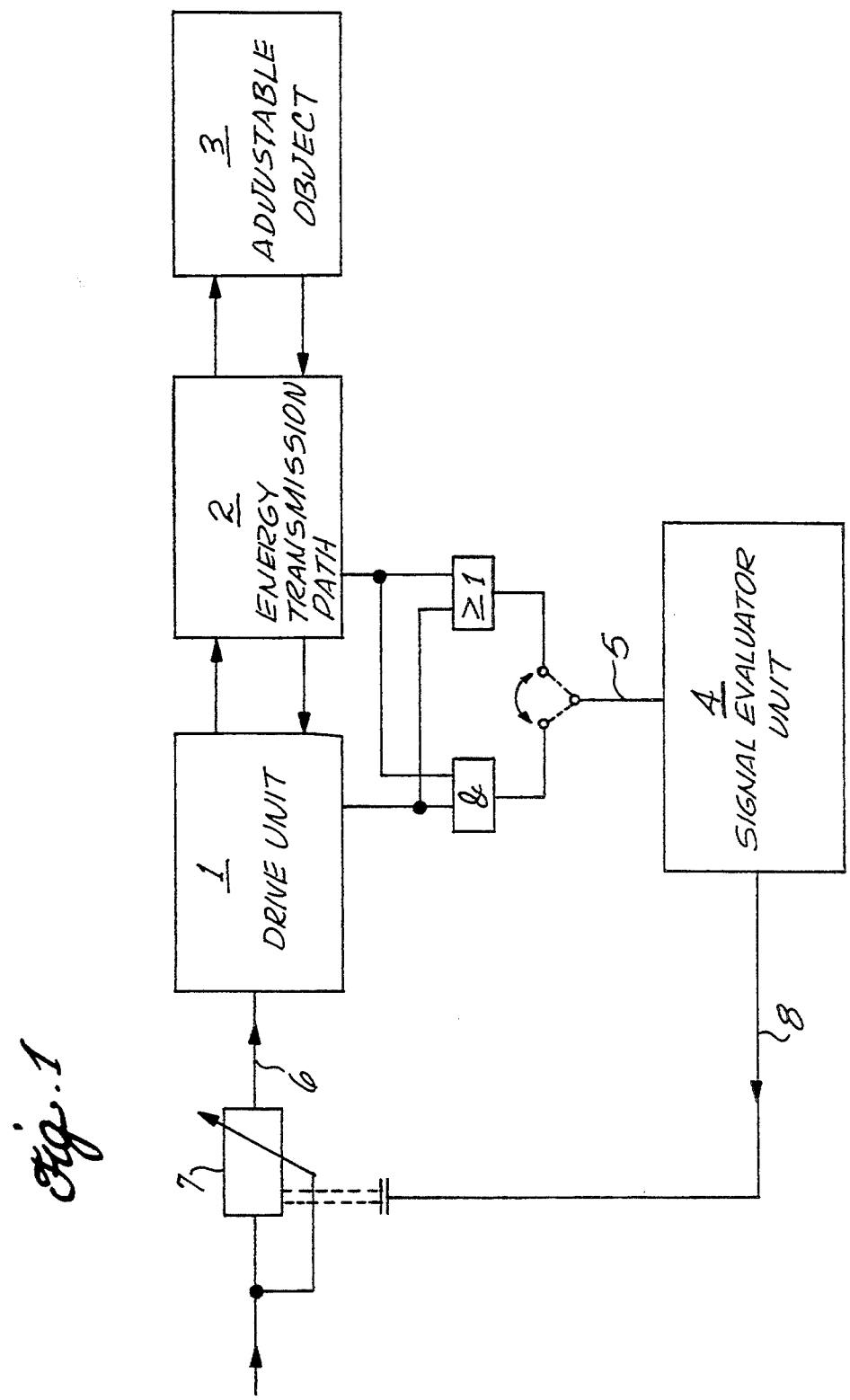

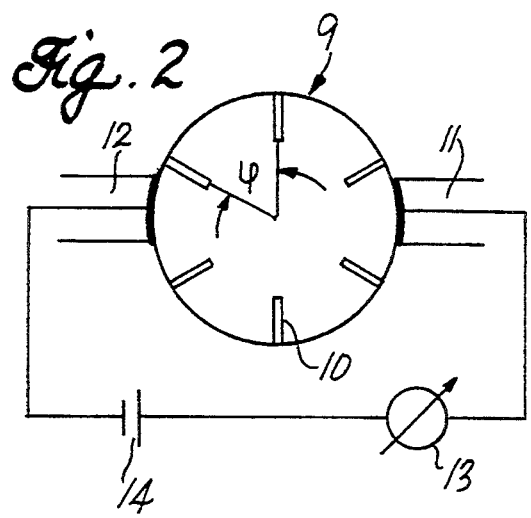
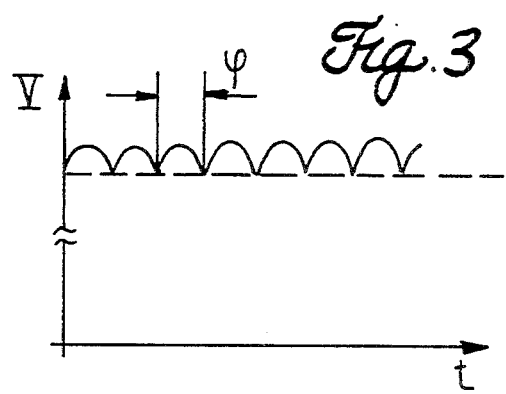
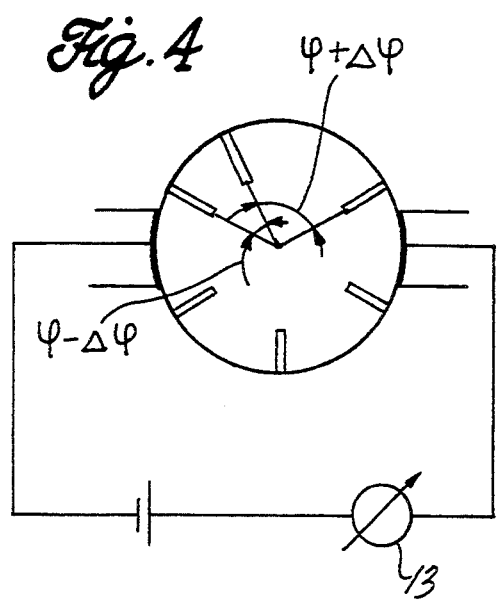
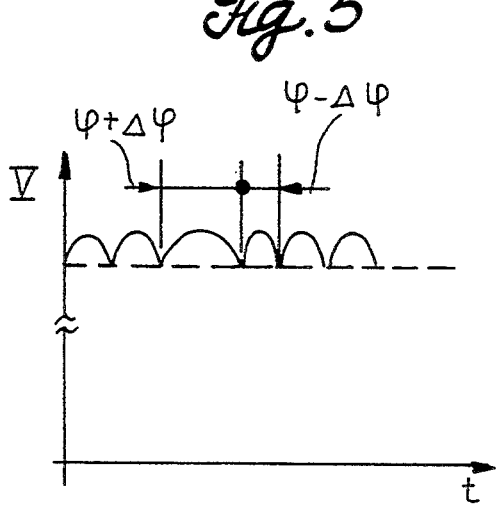

$RW_1 \neq RW_2$

MOTOR STROKE

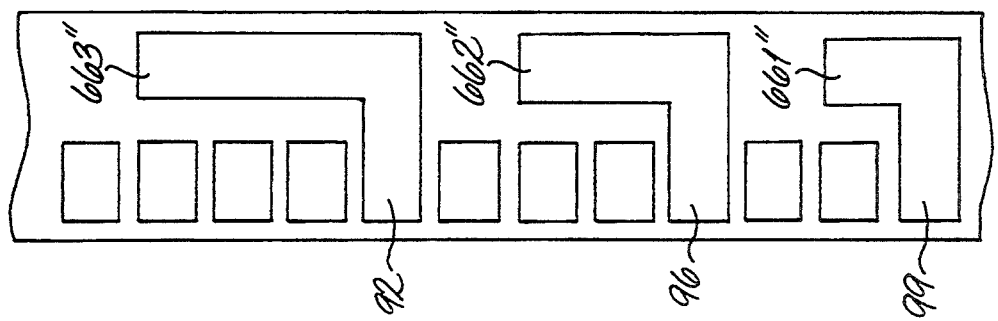
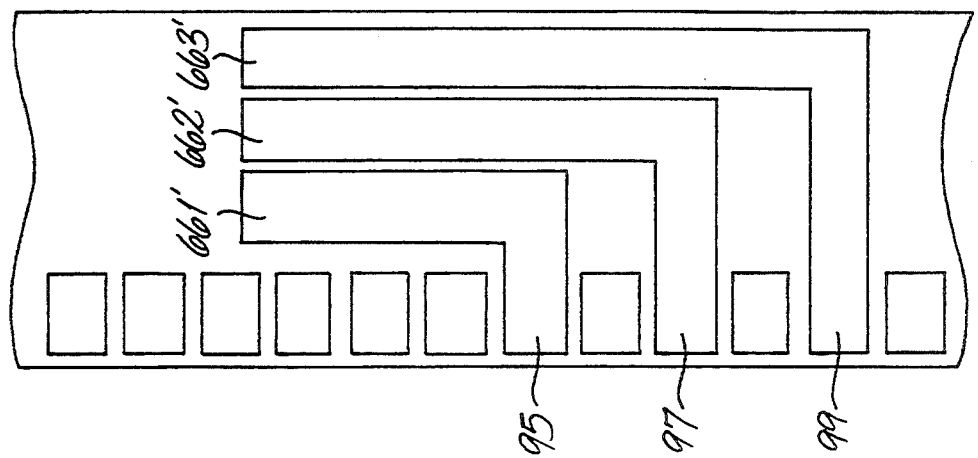
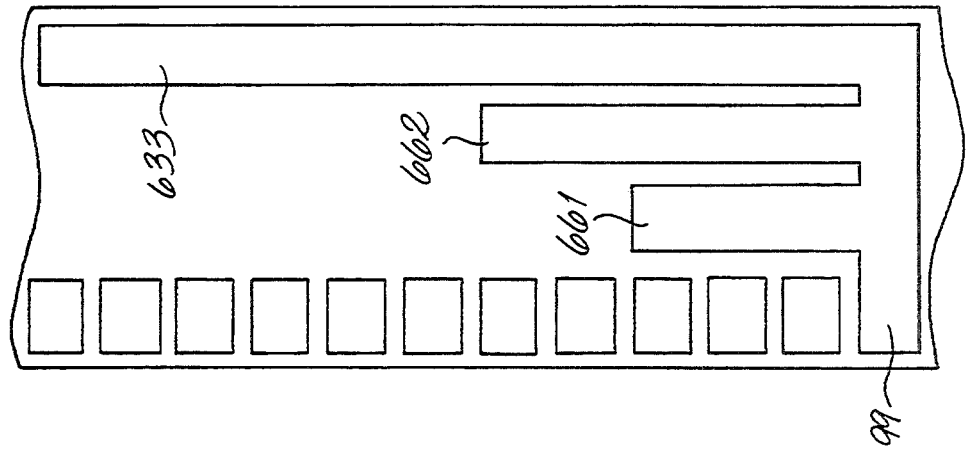

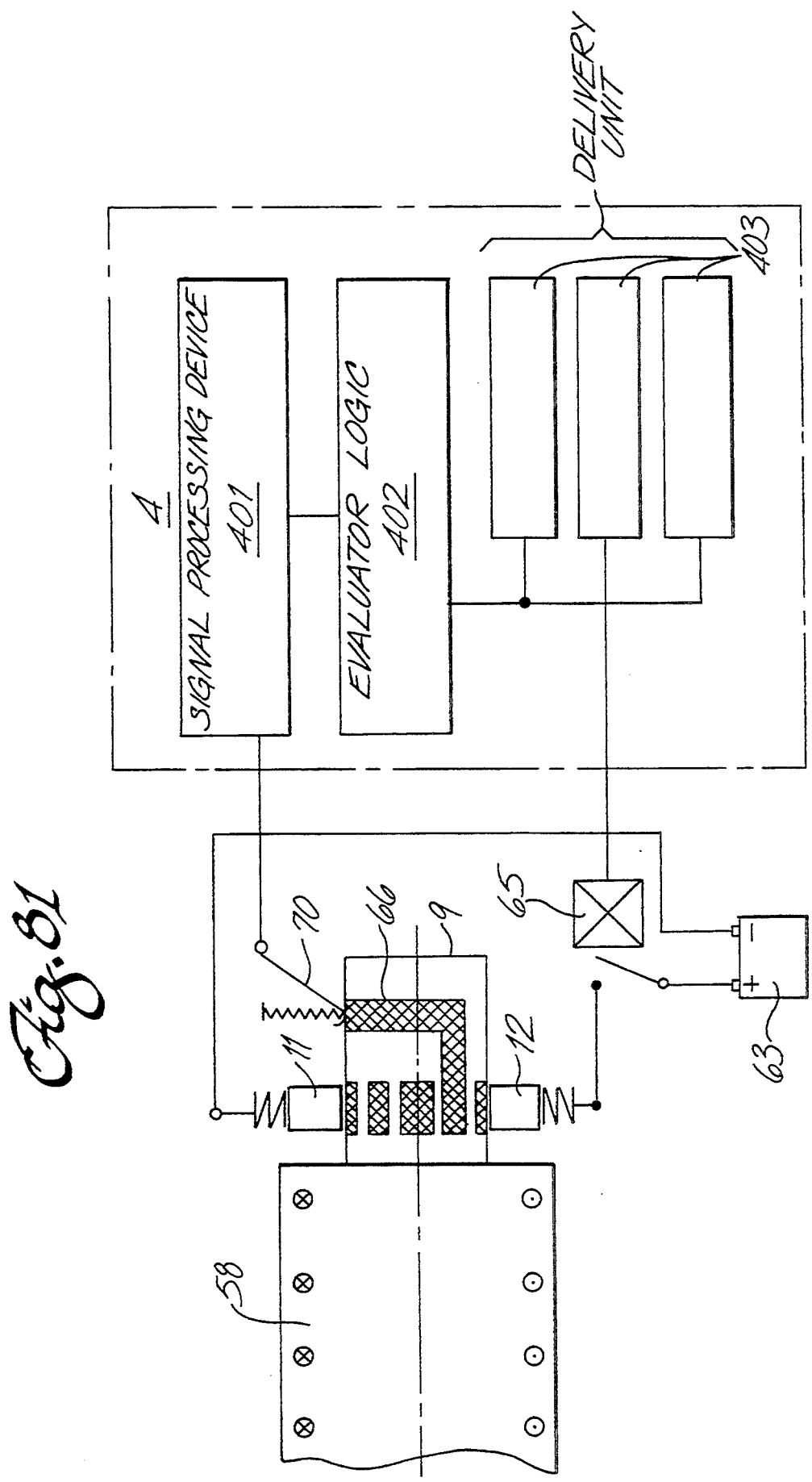

PROCESS FOR DETECTING THE POSITION, DIRECTION OF MOVEMENT AND DYNAMIC CHARACTERISTIC VALUES OF REMOTE-CONTROLLED DISPLACEMENT OF AN ADJUSTABLE OBJECT

The invention relates to a process for detecting the position and direction of movement and for detecting dynamic characteristic values of remote-controlled displacements of an adjustable object according to the preamble of claim 1, and to apparatuses for carrying out the process.

The detection of dynamic characteristic values concerns for example the detection of speed or acceleration values.

The known processes of the kind mentioned above are characterised by the use of sensor and/or transmitter elements and by the high manufacturing costs associated therewith.

DE 30 34 118 C2 discloses a process for electronically monitoring the opening and closing process of electronically operated assemblies, more particularly window winders and sliding roofs in motor vehicles. With this process the speed of an electric setting member of the assembly connected to a d.c.-fed dashboard network is measured and a boundary value is formed from the measured value obtained and then compared with all the following measured values. The speed measurement is thereby made by a perforated disc and light-electric elements or similar sensor parts which are connected to the assembly.

In order to carry out the known process, at least two sensors are necessary to detect the position and direction of movement of the moved parts of the assembly.

EP O 306 795 A1 describes a drive assembly for operating windows, sliding roofs and the like with a commutator motor which in the case of the stationary short circuit can be quickly switched off by an actuation switch. The actuating switch is thereby placed in switch-dependence on the alternating voltage which is induced when the commutator motor is running and which is separated from the basic direct current through a capacitor. This known process uses the system-conditioned properties of the commutator motor to switch on an actuation switch.

The object of the present invention is to provide a process and apparatuses for detecting the position and direction of movement as well as where applicable the dynamic characteristic values of remote-controlled displacements of an adjustable object of the kind mentioned at the beginning which allow the values to be measured to be found without additional sensor or transmitter elements and with only low manufacturing costs.

This is achieved according to the invention in that a signal is detected and evaluated which consists of a system-characteristic signal or the overlapping of several system-characteristic signals.

The solution according to the invention allows the position and direction of movement to be detected as well as the detection of dynamic characteristic values of displacements of a remote-controlled adjustable object. By evaluating system-characteristic signals which contain information on the existing system for displacing an adjustable object it is possible to dispense with additional sensor or transmitter elements.

The signal which is to be evaluated preferably consists of a system-characteristic basic periodicity and at least one signal overlapping same. Measuring is thereby carried out at the drive unit, an energy-transmission stretch connected at the output side of the drive unit, and/or the adjustable object. The signal superimposed on the basic periodicity is an inherent system-characteristic signal or is obtained by deliberate alteration of the system characteristic.

Preferably the current is measured through the drive unit and evaluated in a signal evaluator unit. The current signal through the drive unit is made up of the overlapping of the system-characteristic signals of the drive unit, the energy transmission stretch and of the adjustable object. Secondary signals, such as for example a drop in voltage, can also undergo a corresponding evaluation.

By overlapping a system-characteristic basic periodicity with at least one signal superimposed on same it is possible to break up with great precision the movement of the adjustable object and the values which are to be measured. Measuring the movement of the adjustable object is very finely divided by evaluating the composite signal. This leads to an increase in the reliability in relation to detecting the position, direction of movement and dynamic characteristic values of displacements of the adjustable object and thus to an increase in the functional and operating reliability of the adjustable object.

An advantageous design of the solution according to the invention exists where the superimposed signal is a non-periodic analog signal.

A non-periodic analog signal exists for example in the case of a belt window winder wherein the window pane is connected by an entrainment member to a belt winding machine which winds up the conveyor belt in a coil so that as the transport belt is wound up the diameter of the coil increases and as the belt is unwound so the diameter decreases. The torque and current ratios change accordingly since as the coil diameter increases so the force or torque to be applied increases and correspondingly decreases as the coil diameter decreases.

However in the case of a winding or unwinding process this corresponds to the release of a signal which shows a non-period analog behaviour and thus can be used as an overlapping signal which can be superimposed on the system-characteristic basic periodicity.

Advantageously the signal superimposed on the basic periodicity has a period, amplitude and/or phase deviating therefrom. This serves to divide up the movement of the drive unit as finely as possible.

When using a commutator motor as the drive unit its current wave form is advantageously used as the system-characteristic basic periodicity. The motor current wave form is caused by the commutation between the individual motor windings and thus allows one revolution of the rotor of the electromotor to be divided into a number of partial revolutions corresponding to the number of commutations so that for example where there are six segments of the commutator six current wave form maxima occur.

In addition to the basic periodicity of the commutator a periodicity is preferably evaluated which arises through the differences of adjoining windings of the commutator motor which are conditioned as a result of manufacture. Thus it is proposed to evaluate a deliberately produced amplitude modulation of the basic periodicity which arises through a change in the impedance of at least one commutator winding.

A fixed relation exists between the revolutions of the rotor of the commutator motor and the position of the adjustable object. By overlapping the basic periodicity of the commutator with at least one further signal it is possible to obtain a fine division of one revolution of the rotor of the electromotor. This leads to an increase in the functional and operating reliability in relation to the adjustable object.

In a further preferred embodiment of the invention a pulsating hydraulic pump is selected as the drive unit. By modulating additional pressure fluctuations at the hydraulic pump or through an additional pressure chamber which is biased with a periodic exciter signal it is possible to overlap the system-conditioned wave form with an additional artificially produced wave form signal (system-remote excitation).

A periodic modulation of the current behaviour can furthermore be achieved in the form of viscosity changes in the oil, and thus likewise pressure fluctuations.

In addition to overlapping the basic periodicities with signals which are produced from the system characteristic of the drive unit, a signal is used as the overlapped signal which has its root in the mechanically conditioned wave forms of the energy transfer stretch or adjustable object. Such a root can lie for example in the fluting of the pane edge in the case of window winders, in a detent of the hinge or in the cog sensitivity of gearing parts.

It is likewise within the scope of the invention to evaluate the voltages induced in the coil parts of the armature winding of a commutator motor. Here the system characteristic of the drive unit is evaluated to detect the position, direction of movement and more particularly the speed of a displacement.

An apparatus for carrying out the process according to the invention has a brush-fitted commutator motor and an electronic signal evaluator unit wherein according to the invention at least one bar of the commutator is connected to at least one electrically conducting scanning track which runs substantially parallel to the commutator and whose length is greater than the commutator division. Furthermore each scanning track is associated with a scanning element connected to the signal evaluator unit and detecting the momentary value of the voltage of the scanning track.

The solution according to the invention provides a brush-fitted commutator motor with a device for detecting its speed, rotary direction and/or rotary angle position, which ensures a very precise and reliable detection of each measuring value with reduced expense. The position, direction of movement and displacement speed of the adjustable object are clearly derived from the data regarding the speed, rotary direction and rotary angle position of the commutator motor.

The voltages induced in the series-connected coil parts of the armature winding of a commutator motor provide clear information on both the speed and turning direction and on the rotary angle position of the commutator motor insofar as certain coil parts are measured off intermittently and the relevant measuring-off times are measured so that an increasing and decreasing voltage path is detected.

The commutator motor according to the invention therefore has at least one electrically conducting scanning track running parallel to the commutator and connected to at least one bar of the commutator wherein the length of the scanning track is greater than the commutator division and each scanning track has an associated scanning element connected to the detection unit and detecting the momentary value of the voltage of the scanning track.

A preferred design of the previously described commutator motor exists where the scanning track is designed as part of a circular ring which is preferably open-ended in the circumferential direction. The length of the open-ended scanning track is thereby to conform with the relevant requirements.

By way of example in order to achieve an accurate as possible detection of the rotary direction and speed a track length would advantageously loop around the rotor of the commutator motor by 90° to 110°. With a loop of this extent the voltage signals would be clearly different from each other in the two possible running directions of the rotor so that a sufficient breakdown distance is ensured for a satisfactory evaluation.

However in order to detect the position as accurately as possible it is advantageous to use scanning track with maximum loop so as to be able to detect the voltage path over the largest possible circumferential range of the rotor. The maximum looping angle thereby depends on the scanning surface of each scanning element.

As an alternative to this it is however conceivable to use several insulated scanning tracks set one behind the other in the circumferential direction and each covering for example only two commutator bars so that in the case of a commutator having twelve bars six scanning tracks could be provided.

An another advantageous design of the brush-fitted commutator motor is where the scanning track is designed closed and is connected additionally to another bar of the commutator. This design makes it possible to measure the differential voltage which leads to a steeper voltage path and thus to voltage signals which clearly differ from each other whereby the breakdown distance can be improved in the case of signal evaluation.

With this design it is proposed that the ohmic resistance of the scanning tack is greater than the ohmic resistance of a coil part of the armature winding so that the motor properties are not impaired. Advantageously the ratio of the resistances is RS/RA > 100 wherein RS defines the ohmic resistance of the scanning track and RA the ohmic resistance of the armature winding.

A simple reliable reading of each scanning track can occur where the scanning element consists of a sliding contact aligned with the scanning track.

As an alternative the scanning element can consist of a voltage detector element set galvanically separated from the scanning track. Mechanical wear of the scanning track and scanning element is hereby avoided.

A further design of the brush-fitted commutator motor is characterised in that several scanning tracks of different length are provided parallel to each other. By means of this design it is possible to increase the accuracy in detecting the speed, rotary direction and/or position in that the detected voltage values are compared with each other and preferably standardized.

The signal evaluator unit preferably consists of a device for preparing signals, an evaluator logic and a device for issuing a signal for the rotary direction, speed or rotary angle position or for all three aforesaid values respectively. A signal evaluator unit designed in this way makes it possible to switch off and when necessary if required to reverse the direction of rotation of the commutator motor provided the detected voltage values and the position, direction of movement and displacement speed derived therefrom signal a clamping process.

Advantageously the signal evaluator unit has at least one electronic filter for fading out the vibration-conditioned breakdown signals. Signal interferences which are caused for example by mechanical vibrations of the sliding contact or rotor can hereby be suppressed where applicable.

A further device for carrying out the process according to the invention consists of a drive unit, an energy transmission stretch, an adjustable object and an electrical signal evaluator unit. The signal evaluator unit detects a signal which can be measured at the drive unit, the energy transmission path and/or the adjustable object and which has a system-characteristic basic periodicity and also detects at least one signal overlapping this basic periodicity and produces a correlation of the two signals from which the position, direction of movement and dynamic values of the adjustable object can be determined.

In an advantageous design of this device according to the invention for a commutator motor as the drive unit the commutator segments are mounted asymmetrically. The current wave form of the commutator motor is thereby correspondingly lengthened and shortened in its time path. This allows in particular a detection of the direction of movement.

Further advantageous embodiments of the device according to the invention are described in the following description of the drawings.

The invention will now be explained in further detail with reference to the numerous embodiments shown in the drawings in which:

FIG. 1 is a diagrammatic block circuit diagram of a device according to the invention;

FIGS. 2-27 show examples of electrical wave form causes in the case of a commutator motor;

FIGS. 78a-78c are diagrammatic illustrations of differently configured scanning tracks;

FIG. 81 is a block circuit diagram of a supply and control circuit for detecting the speed, direction of rotation and rotary angle position of a commutator motor.

Figure 6:
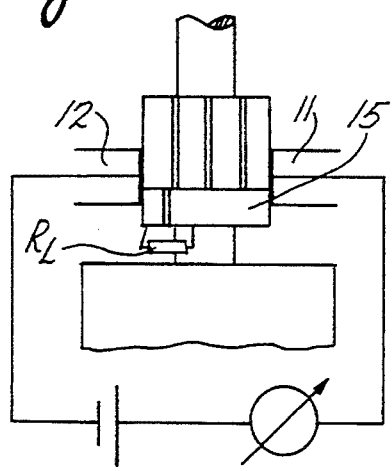

The diagrammatic block circuit diagram of FIG. 1 shows a drive unit 1, an energy transmission path 2, an adjustable object 3 and a signal evaluator unit 4. The signal 5 supplied to the signal evaluator unit 4 arises from the overlapping of the system-characteristic signals of the drive unit 1, the energy transmission path 2 and the adjustable object 3. The signal evaluator unit 4 analyzes the signal 5 and determines therefrom an answer signal 8 which regulates the energy flux 6 into the drive unit 1. The regulation of the energy flux 6 controlled by the answer signal 8 is carried out by the regulator 7.

Various causes for the current wave form of a commutator motor are illustrated in FIGS. 2 to 46 using the example of a commutator motor as the drive unit 1.

FIG. 2 shows a commutator 9 with six commutator segments 10 which are connected to the rotor winding of the commutator motor and on which two slip brushes 11 and 12 which are preferably made of graphite. A measuring unit 13 measures the current through the commutator motor. A direct current voltage source 14 ensures a constant voltage is connected to the electromotor. The angle $\phi$ between the individual commutator segments 10 is constant.

FIG. 3 shows the known basic periodicity of the motor current (basic wave form), as shown in a current-time diagram. The current I through the measuring unit 13 in FIG. 2 is given on the Y-coordinate and the time t on the X-coordinate.

By dividing up the commutator asymmetrically as shown in FIG. 4 the associated current wave form measured with the measuring unit 13 is stretched and compressed correspondingly (FIG. 5). Through this type of asymmetric division of the bars of the commutator 9 it is possible in particular to detect the direction of rotation.

Figure 7:
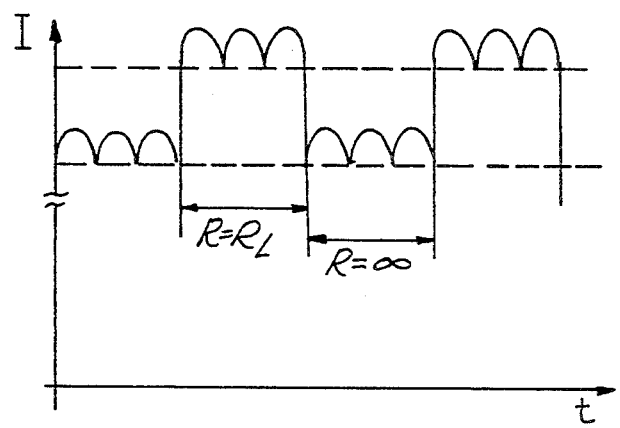

Using an additional slip ring 15 covered partially by the brushes 11,12 and whose bars cover at least two bars of the actual commutator 9 and wherein the slip ring has an ohmic load $R_L$ produces an additional wave form (FIG. 6). This is shown in FIG. 7 in dependence on time. A rectangular voltage overlies the basic periodicity of the commutator 9.

A further possibility of producing an additional wave form consists in a periodic change in the brush contact pressure and thus change-over resistance. A periodic change of this kind can have a mechanical cause such as for example an eccentric bearing of the commutator or the use of an elliptical commutator (FIG. 8).

Figure 8:
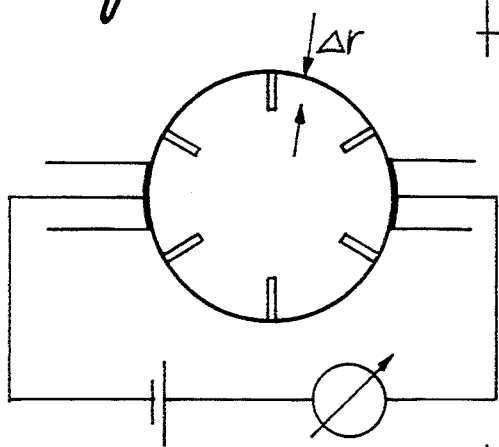
Figure 9:
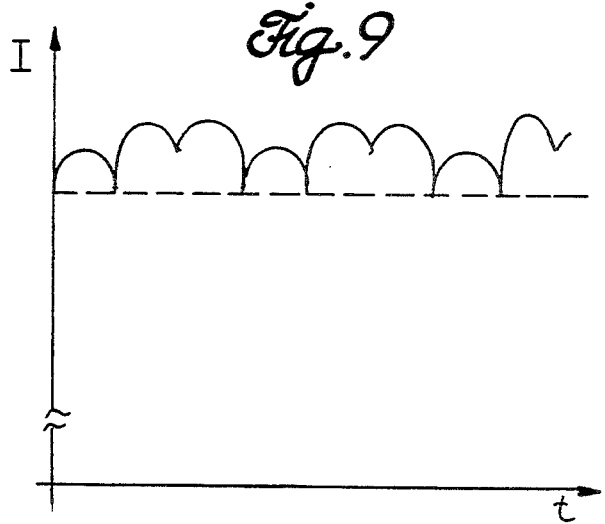

FIG. 9 shows the current-time diagram belonging to the arrangement shown in FIG. 8.

Figure 10:
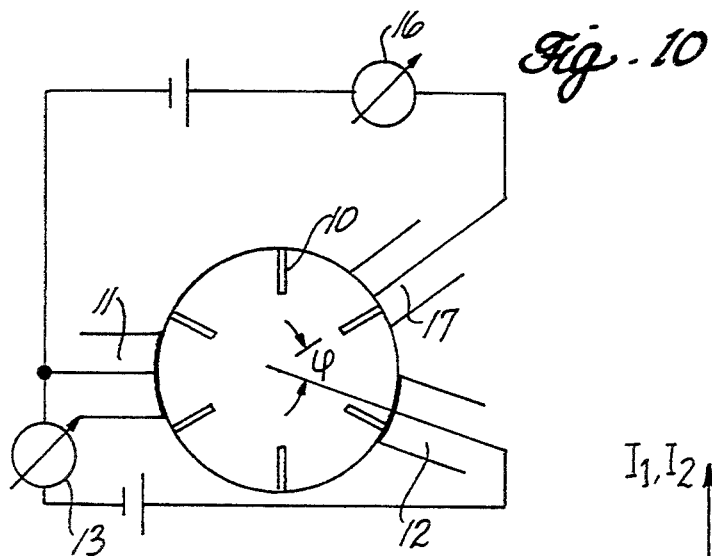
Figure 11:
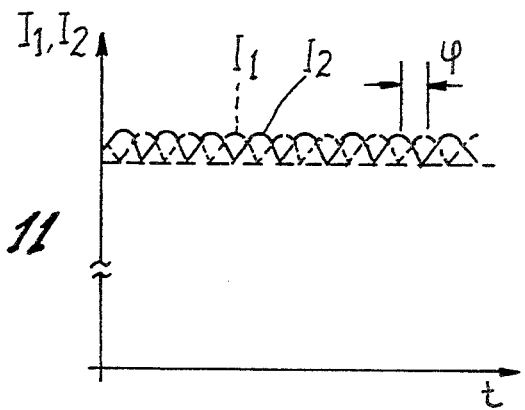

In FIG. 10 a third brush 17 is associated with the commutator segments 10. The corresponding currents $I_1$ and $I_2$ are measured at two measuring units 13 and 16. FIG. 11 shows the time path of the two currents. When using the superposition principle the ability to split up the two wave form signals is increased. It is within the scope of the invention to combine the characteristic elements of FIGS. 10 and 4.

Figure 12:
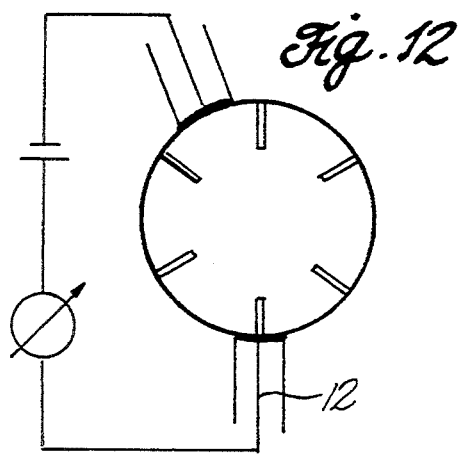
Figure 13:
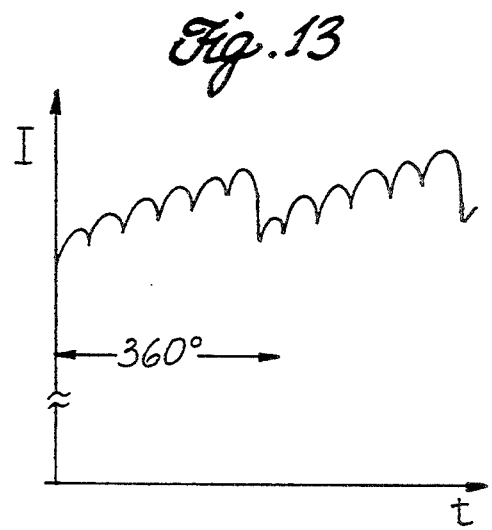

A further example of producing an additional wave form through a corresponding arrangement of the brushes is shown in FIG. 12. Here the two brushes 11, 12 are arranged asymmetrical, thus at an angle other than 180°. As the asymmetry of the brush arrangement increases the corresponding current-time diagram shows the basic periodicity shown in FIG. 3 taking on a saw-tooth function. It is thereby possible in particular to detect the rotary direction.

Figure 14:
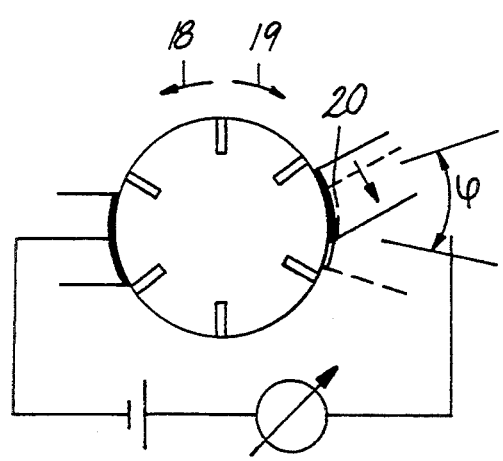
Figure 15:
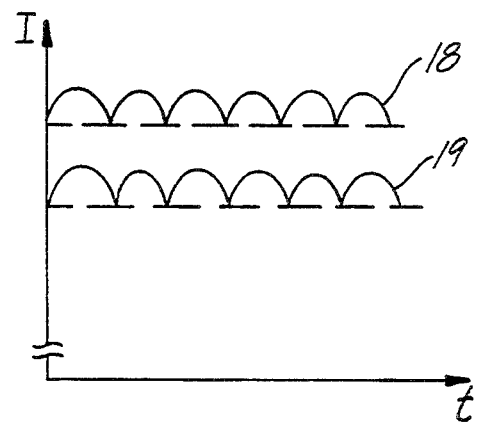
Figure 16:
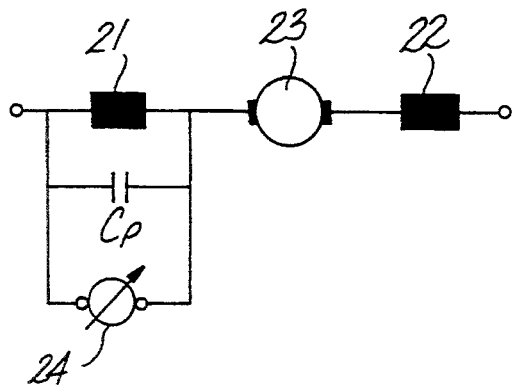
Figure 17:
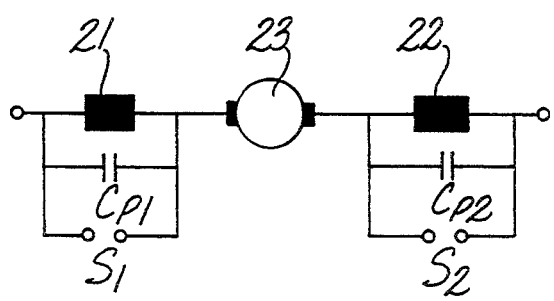
Figure 18:
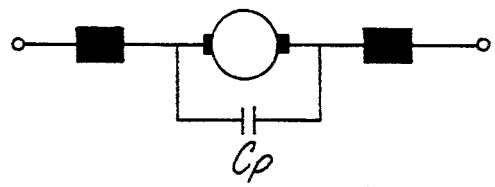
Figure 19:
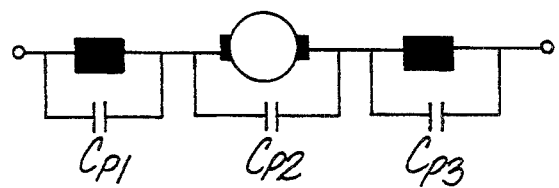
Figure 20:
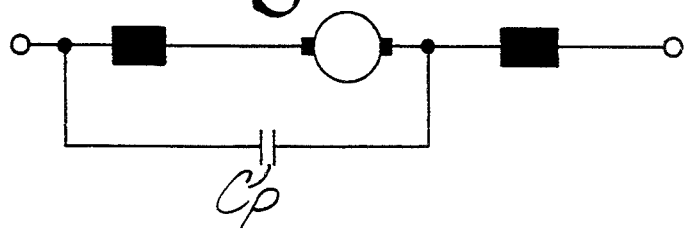
Figure 21:
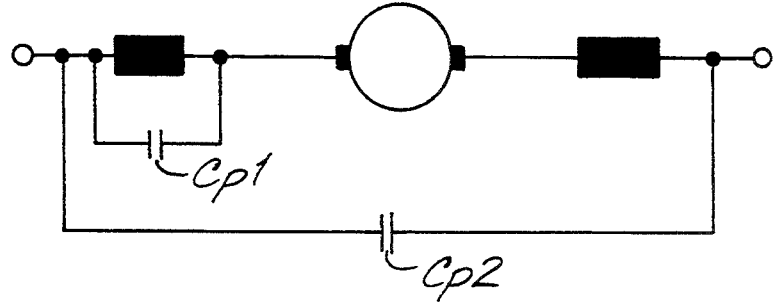
Figure 22:
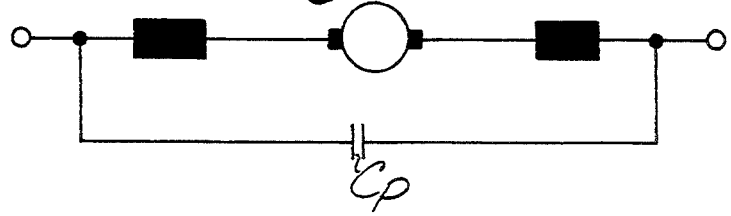
Figure 23:
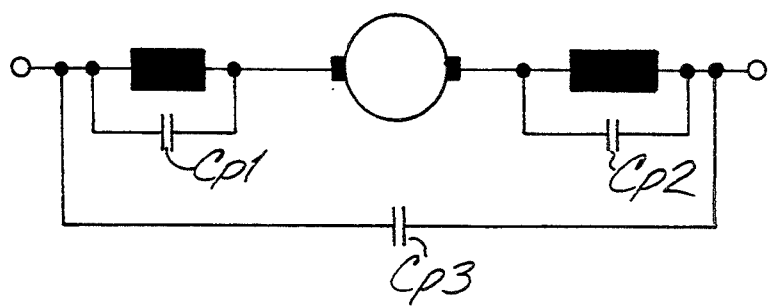
Figure 24:
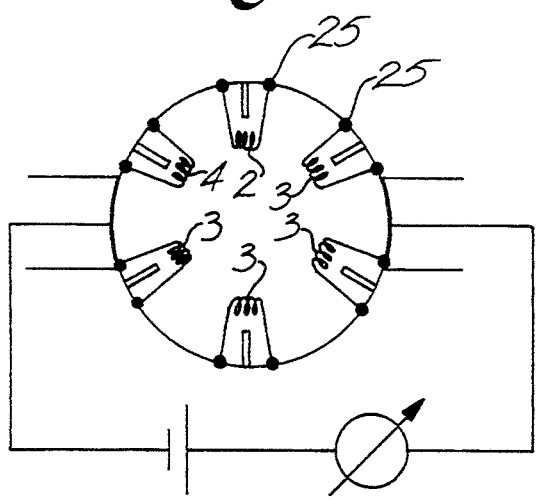

A controllable brush 20 which can be deliberately tilted and has a non-homogeneous conductivity in the circumferential direction changes the electrical change-over resistance according to the rotary direction of the motor (FIG. 14). The brushes thereby tilt according to the direction of rotation. The current path is shown in dependence on time in FIG. 15 for the two possible rotary directions 18 and 19. The non-homogeneity of the conductivity of the brushes 20 is continuous, possibly through different graphite proportions, or multipart. The non-homogeneous conductivity of the brush 20 makes it possible in particular to detect the rotary direction.

FIGS. 16 to 23 show examples for circuits in which parallel capacities $C_p$ as parts of an LC-oscillator make it possible to intensify the wave form signal through resonance excitation in the resonance range of each vibration circuit. The suppressing throttles 21 and 22, such as series resistors which limit the current through the electromotor 23 such as when the electromotor 23 is standing still or turning relatively slowly, are connected in series with the electromotor 23. There are one, two or three resonance frequencies corresponding to the number of capacitors connected in parallel. The signal to be evaluated is obtained at the measuring point 24.

Figure 25:
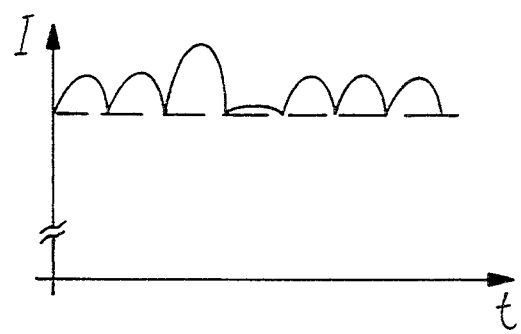
Figure 26:
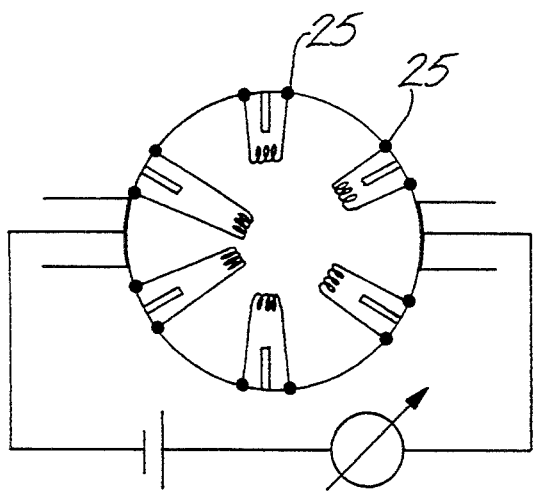

Varying the motor winding 25 by one or more windings (FIG. 24) modulates the existing basic wave form as shown in FIG. 25.

Figure 27:
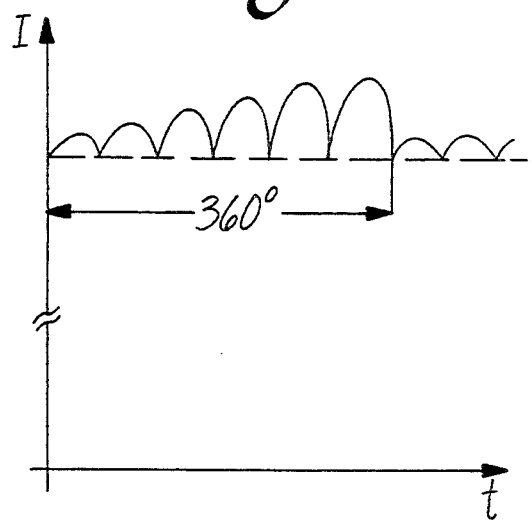

Different lengths in parts of the motor winding 25 inwards or outwards conditioned through winding technology (FIG. 26) cause in the illustrated example the wave form signal to take on a saw-tooth function (FIG. 27). The different length parts are thereby conditioned by the relevant position of the windings.

Figure 28:
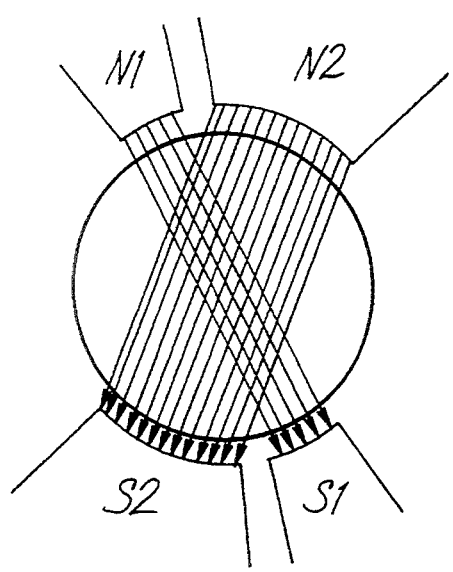
FIGS. 28-37 show examples of magnetic wave form causes in the case of a commutator motor.
Figure 29:
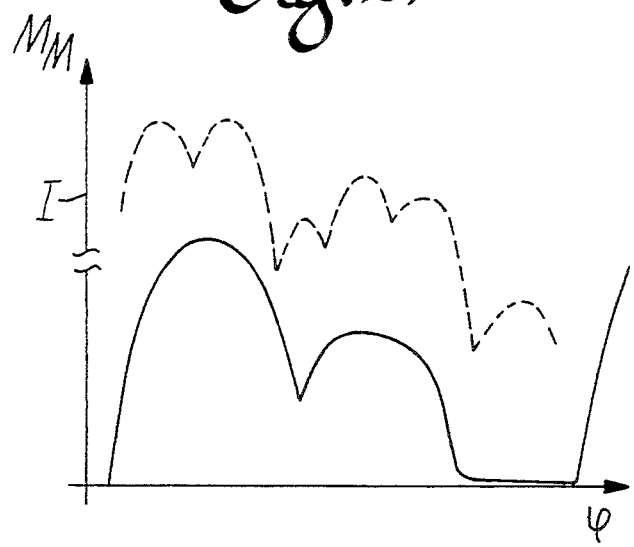

A further possibility for producing wave forms is based on the use of magnetic wave form causes:

FIG. 28 illustrates the use of asymmetric permanent magnets for the signal modulation. An asymmetric permanent magnet has uninterrupted pole parts N1, N2 and S1 and S2. The basic wave form of the commutator motor is overlapped with the current path I which is modulated by two magnetic detent moments $M_M$. The current path I is shown in dotted lines in FIG. 29 and the magnetic moment $M_M$ in solid lines.

Figure 30:
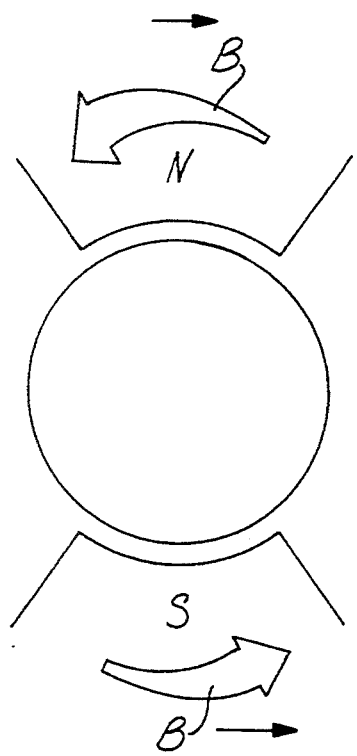
Figure 31:
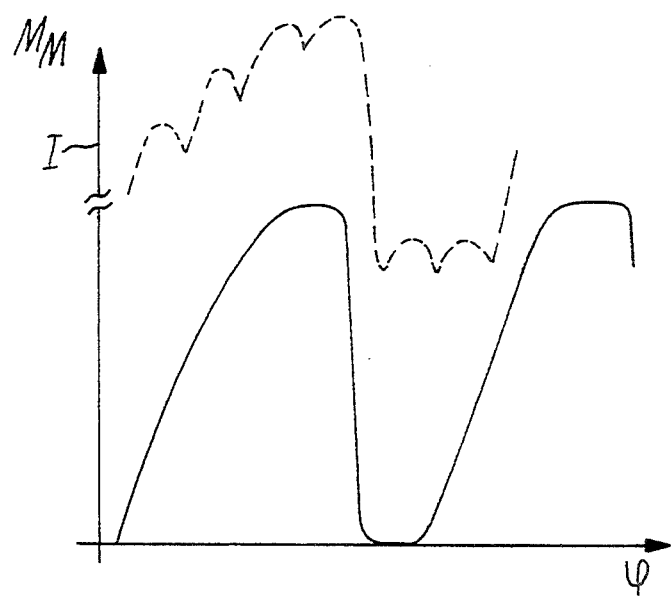

The basic wave form of the commutator motor is correspondingly overlapped with a current path modulated through a magnetic detent moment through an anisotropic magnetic material with magnetic induction B which changes continuously in the radial direction (FIGS. 30 and 31). The resulting saw-toothed path of the measuring signal is intended and suitable for detecting the direction of rotation.

Figure 32:
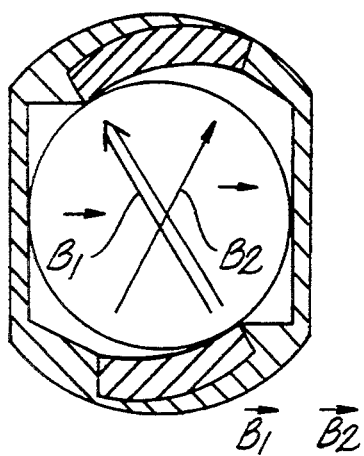
Figure 33:
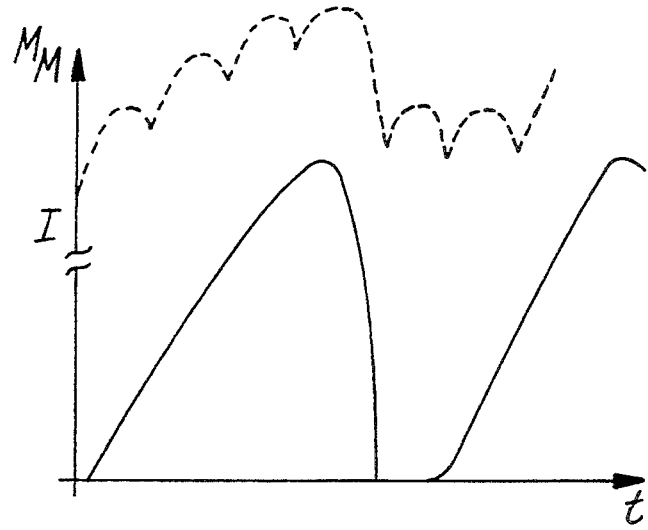

The width of the air gap in the circumferential direction changes continuously by tilting the permanent magnets. The path of the magnetic flux is thereby divided up into two components $B_1$ and $B_2$ which cause a double magnetic scanning of different strength (FIGS. 32 and 33).

Figure 34:
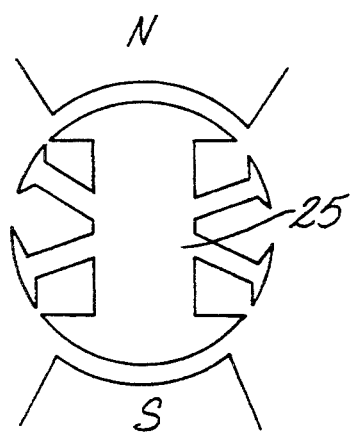
Figure 35:
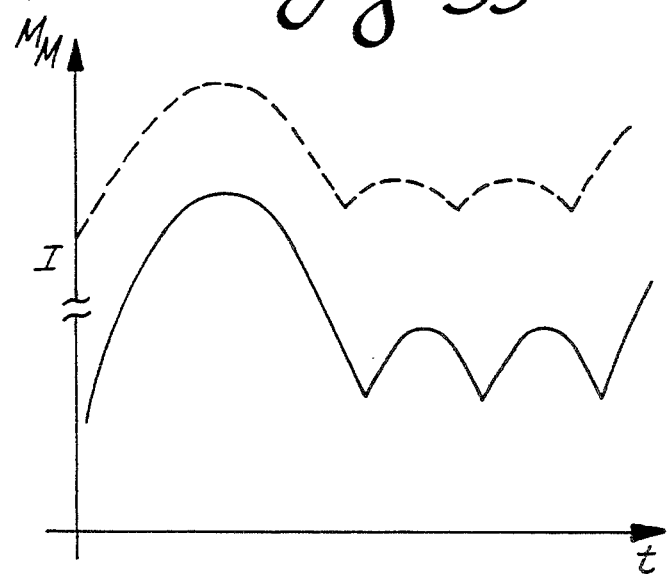

Furthermore a current modulation is achieved through an asymmetric armature plate section which has magnetic resistances which are different according to the angular position (FIGS. 34 and 35).

Figure 36:
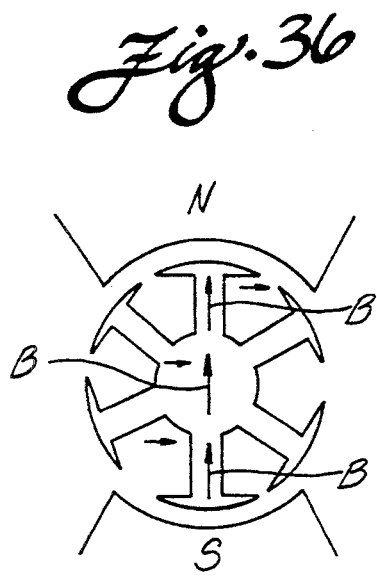
Figure 37:
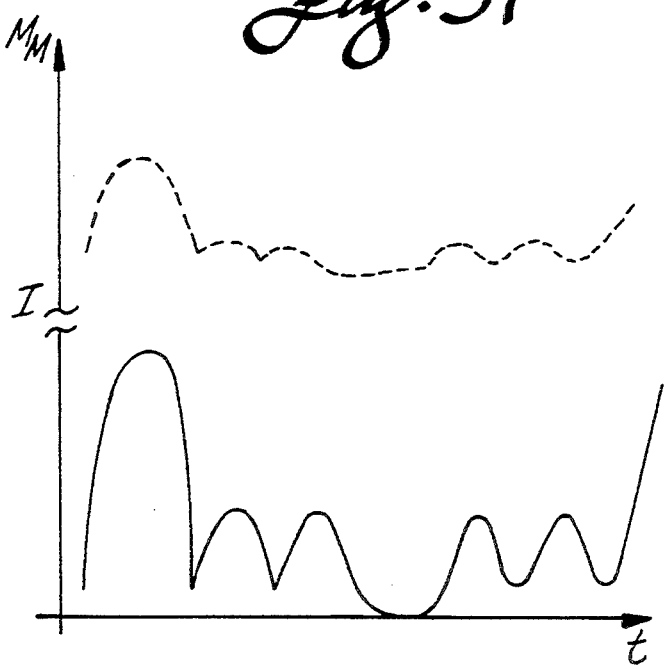

Pre-magnetizing the armature of the commutator motor in a forward-pulling direction causes an additional magnetic moment and likewise modulates the motor current (FIGS. 36 and 37).

Figure 38:
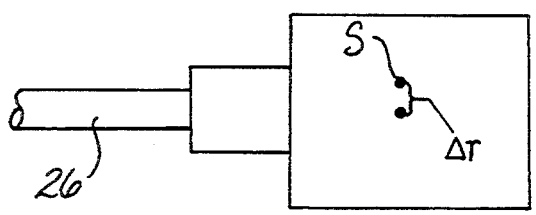
FIGS. 38-46 show examples of mechanical wave form causes in the case of a commutator motor, FIG. 42 consists of FIGS. 42a, 42b and 42c.
Figure 39:
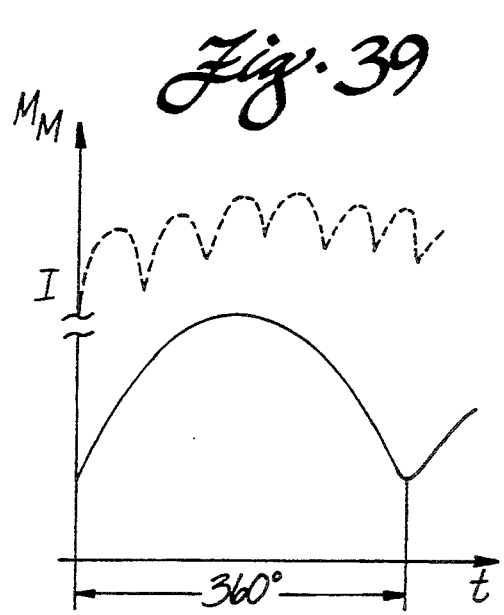
Figure 40A:
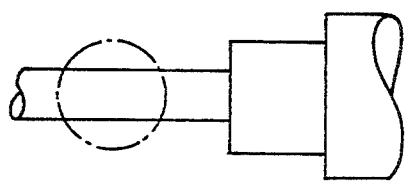
Figure 40B:
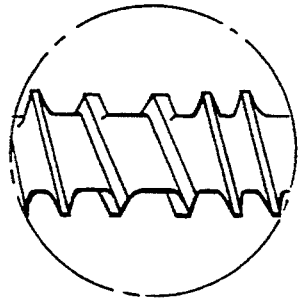
Figure 41:
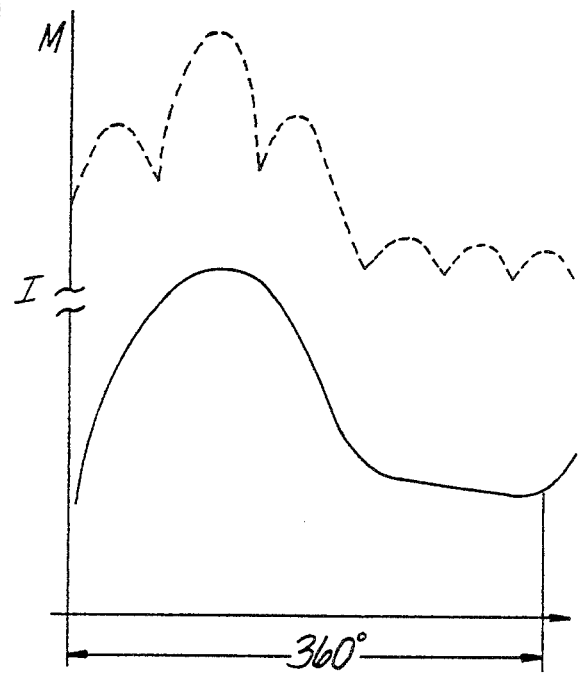

FIGS. 38 to 46 show examples of mechanical wave form causes and their utilization for detecting the position and direction of rotation:

An artificially produced radial unbalance of the armature shaft 26 produces an additional periodic load moment $M_M$ which is superimposed on the driven torque (FIGS. 38 and 39). A superimposed periodic friction moment is achieved both through an uneven pitch in the worm of the armature shaft 26 (FIGS. 40 and 41), an uneven worm wheel pitch and through a radial unbalance or an uneven module 28 of the driven pinion (FIG. 46), which also may produce variation in the current through the motor.

Figure 42A:
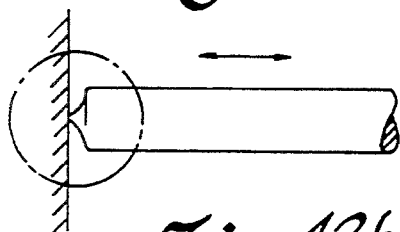
Figure 42B:
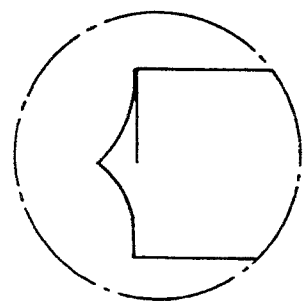
Figure 42C:
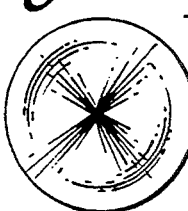
Figure 43:
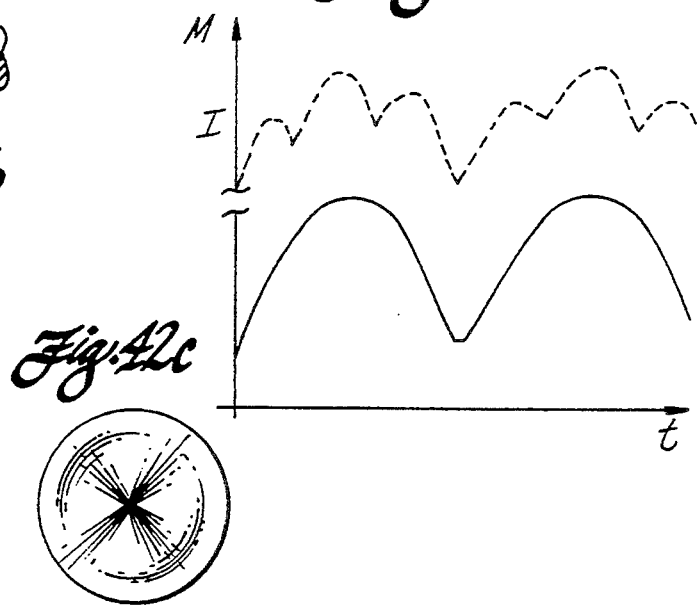

As shown in FIGS. 42 and 43, a wavy pattern of the plastics mushroom, which may be shown in FIG. 43 at the left thereof, for bearing or supporting the shaft of the commutator motor causes a longitudinal vibration of the armature and thus a modulation of the friction transmission behaviour between the worm and worm wheel and thus of the current path. Many types of thrust or other bearings in motors may have irregularities which may cause similar longitudinal vibrations which could modulate the friction transmission behaviour between the worm and worm wheel and thus of the electrical current path of the current flowing through the motor.

Figure 44:
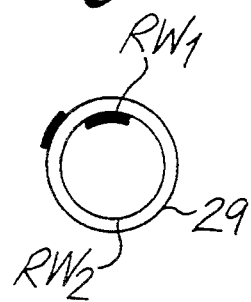
Figure 45:
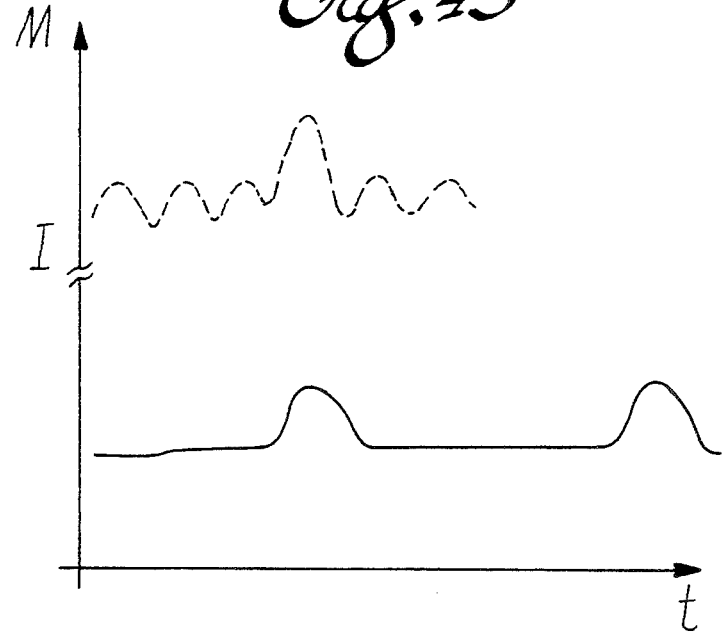
Figure 46:
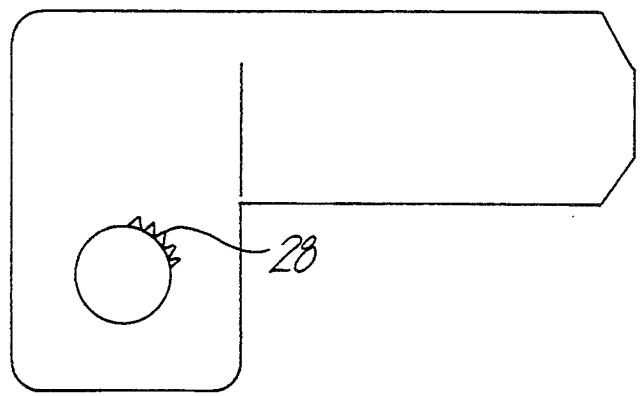

An additional period friction moment is also modulated up to the driven moment through different friction values $RW_1$ and $RW_2$ on the circumference of the armature shaft bearing 29 of the commutator motor (FIGS. 44 and 45).

Figure 47:
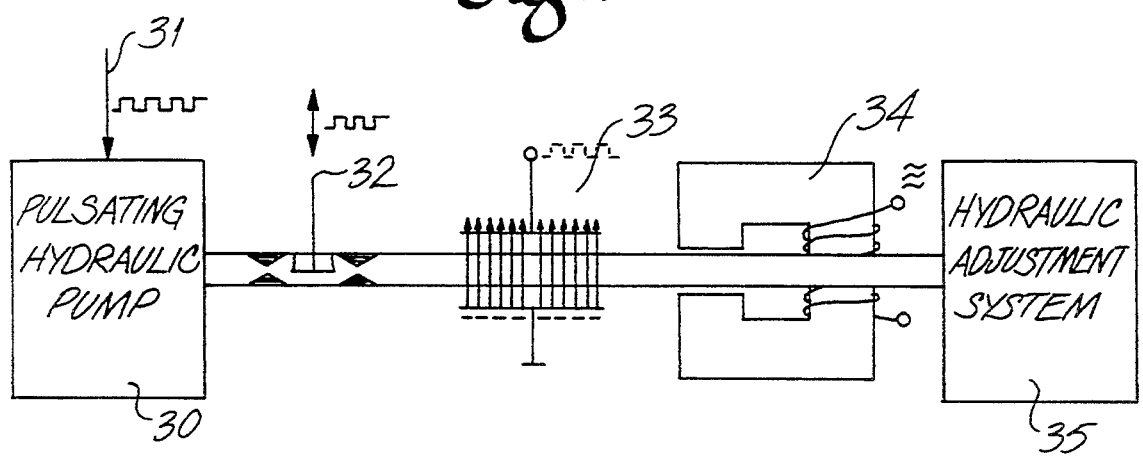
FIG. 47 shows examples of hydraulic wave forms when using a hydraulic pump as the drive unit.

In FIG. 47 a pulsating hydraulic pump 30 is selected as the drive unit for a hydraulic adjustment system 35. By modulating up additional pressure fluctuations 31 on the hydraulic pump which are produced somewhat mechanically, or through an additional pressure chamber 32 which is biased with a periodic exciter signal it is possible to superimpose an additional artificially produced wave form signal (system-remote excitation) on the system-conditioned wave form. A representative periodic signal is shown beside reference numerals 31 and 32.

Figure 48:
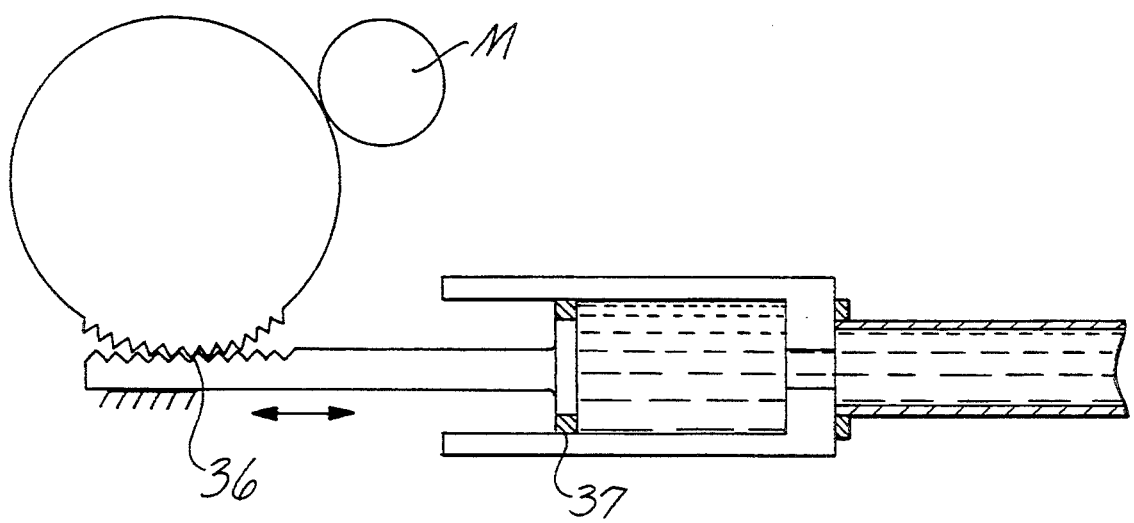
FIG. 48 shows examples of hydraulic wave forms when using a gearwheel drive.

Furthermore a periodic modulation of the current behaviour and thus pressure fluctuations can be achieved in the form of electrostatic viscosity changes 33 or magnetic viscosity changes 34 in the fluid of the hydraulic system. For this the fluid which is an electro-rheological fluid or a ferro-fluid is deliberately penetrated by a periodically fluctuating electrical or magnetic field.

Where the hydraulic drive assembly is designed as a gear rod driven by a gearwheel which is driven by a motor M, an additional periodic wave form signal is produced through the tooth sensitivity 36 during the force change-over between gearwheel and gear rod. Under certain conditions the "stick-slip" effect occurs on the friction surface between the piston and cylinder 37, arising from the change between adhesive and sliding friction (FIG. 48). By overlapping into the hydraulic system, two mechanical wave forms thereby produce one hydraulic wave form.

The remaining Figures show examples of mechanical wave form causes in the energy transmission path, such as a window winder, or in the adjustable object, such as a window pane.

Figure 49:
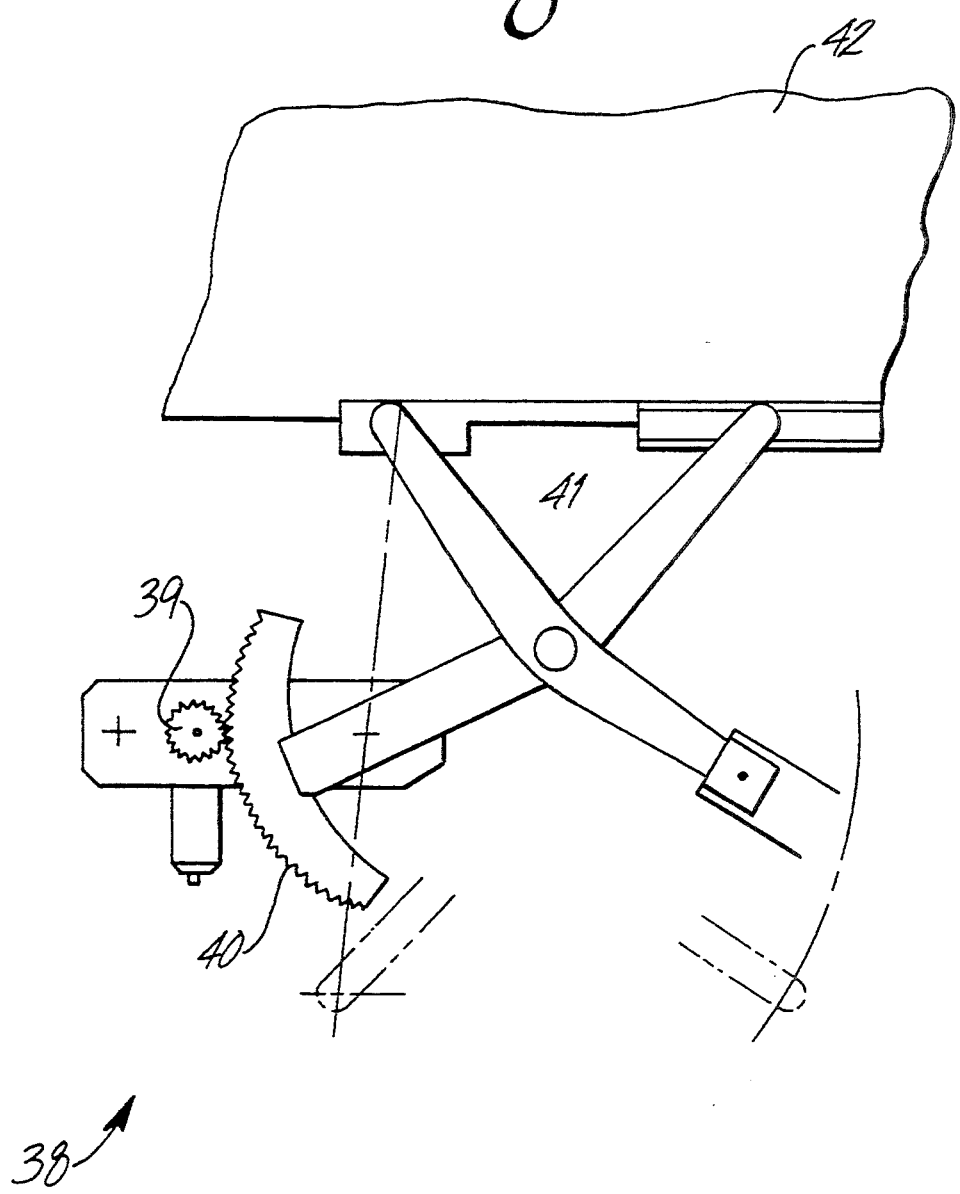
FIGS. 49-67 show examples of mechanical wave form causes in the case of a window winder.

FIG. 49 shows a cross-arm window winder 38 consisting inter alia of a pinion 39, a toothed segment 40 engaging therewith and an entrainment member 41 on which the window pane 42 is supported.

Figure 50:
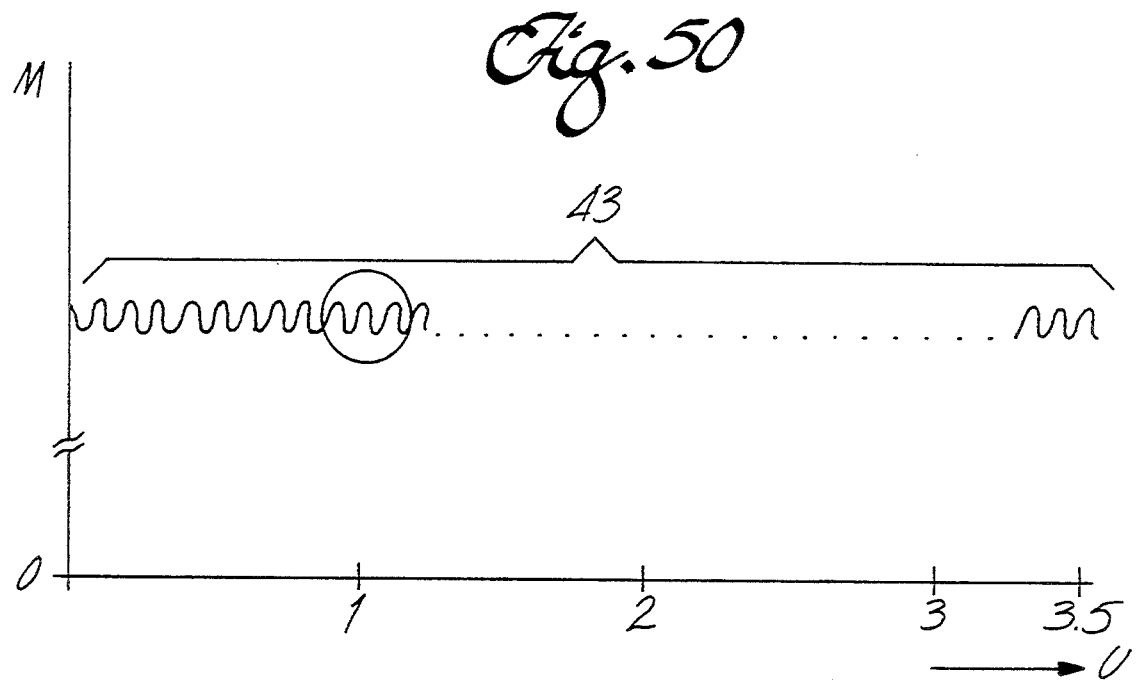

The characteristic pinion-segment-tooth sensitivity produces wave form signals as shown in FIG. 50 which are superimposed on the commutator wave form. The revolutions U of the pinion 39 are thereby registered on the X-axis and the friction moment M on the Y-axis. A complete pane lift corresponds to the path 43.

Figure 51:
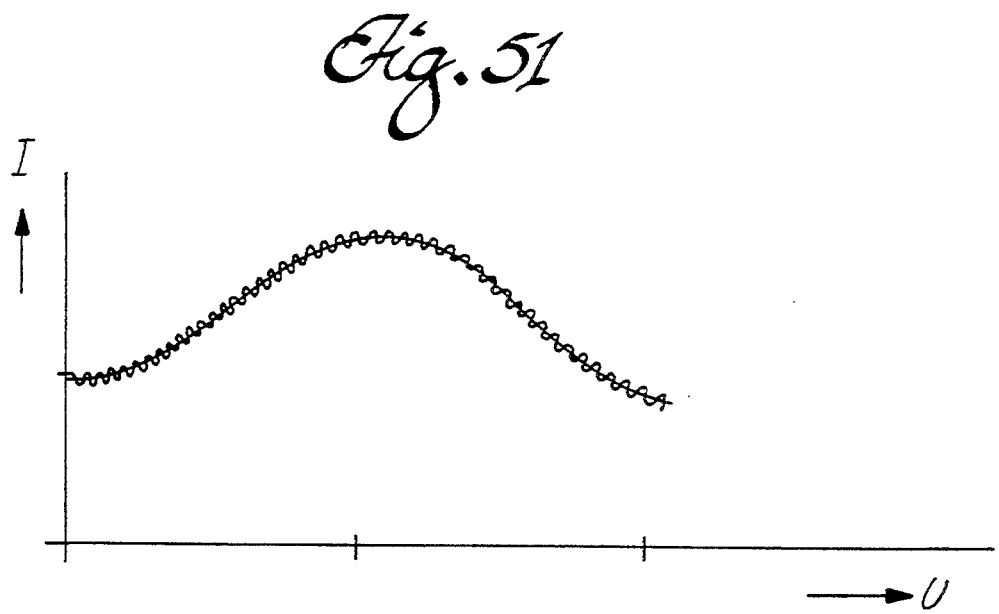

FIG. 51 shows the corresponding current path wherein one cog of the pinion corresponds to the period illustrated. By way of example 6 revolutions of the electromotor and 60 wave form signals of the commutator for a 10-bar commutator correspond to one cog of the pinion. The wave form signal is superimposed on the period shown in FIG. 51 as small fluctuations.

Figure 52:
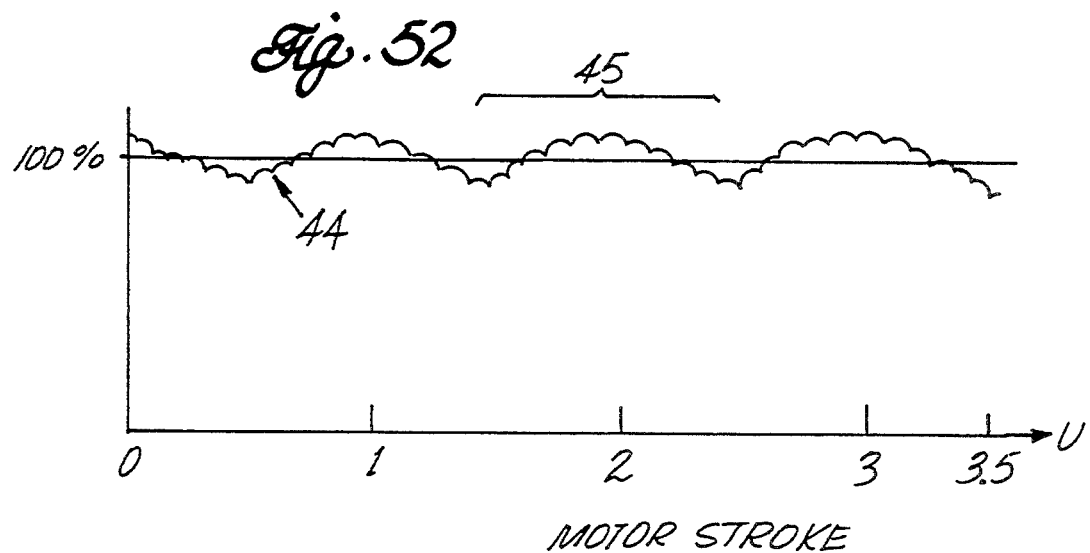

A periodic awkward movement of the pinion causes a further overlapping of the commutator wave form. In FIG. 52 the short period 44 shows the tooth sensitivity and the long period 45 the eccentricity of the window winder. In other words, FIG. 53 may appear to show the periodicity introduced by the teeth of the pinion in contact with the gear, which produces a signal which is concomitant with the movement of the pinion from one tooth on the pinion to the next tooth on the pinion. This periodicity may be exaggerated due to any eccentricity of the window winder, that is, such as the window crank for raising and lowering the window.

Figure 53:
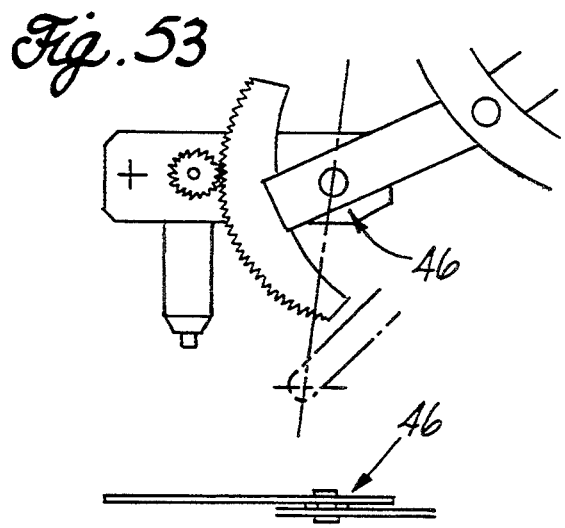
Figure 54:
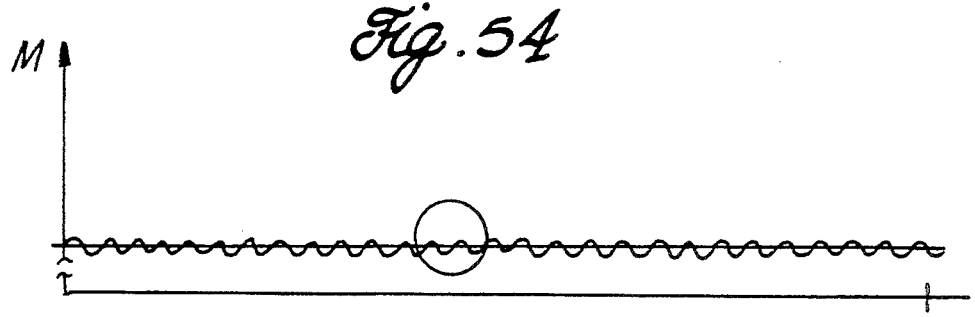
Figure 55:
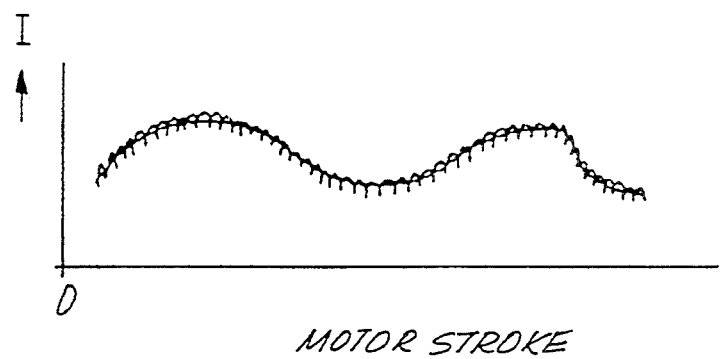

Furthermore an overlapping of the commutator wave form arises through a hinge detent pattern 46, as shown in FIG. 53, that is, this overlapping may be caused by the pattern of movement of the hinged detent 46. FIGS. 54 and 55 show the corresponding friction moment M and the current I wherein the commutator wave form corresponds to the small fluctuations in FIG. 55.

FIGS. 56, 59, 61, 64 and 66 show a window winder with cable drum 51, cable, guide pulley 53 and guide rail 47.

Figure 56:
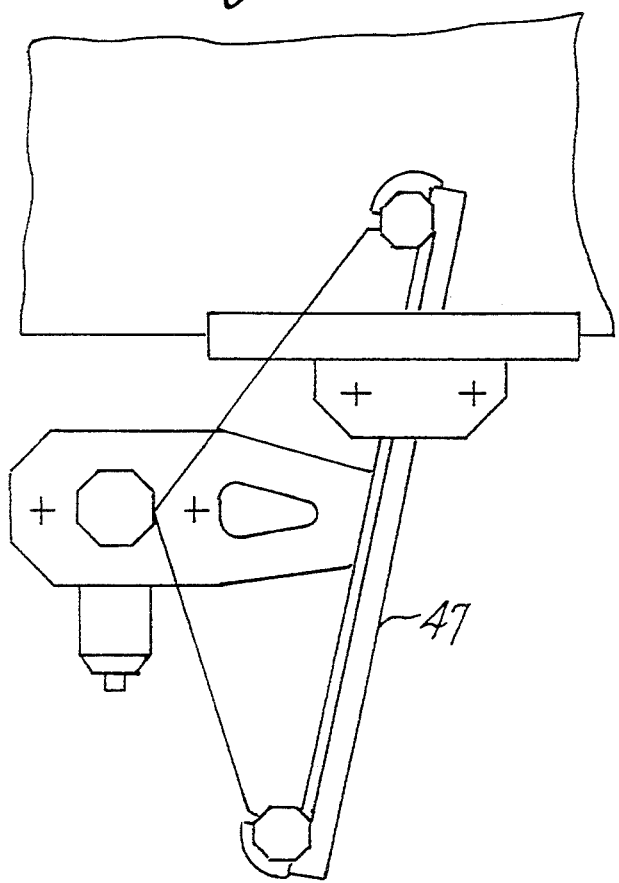
Figure 57:
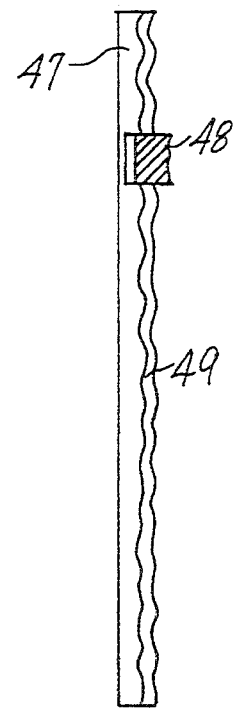
Figure 58:
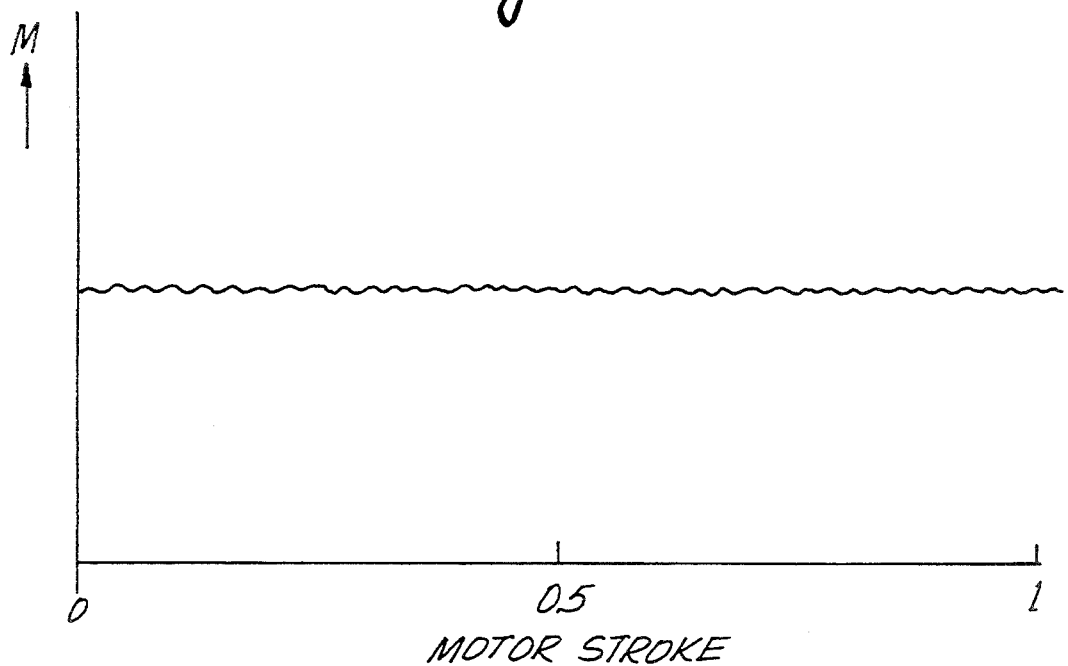
Figure 59:
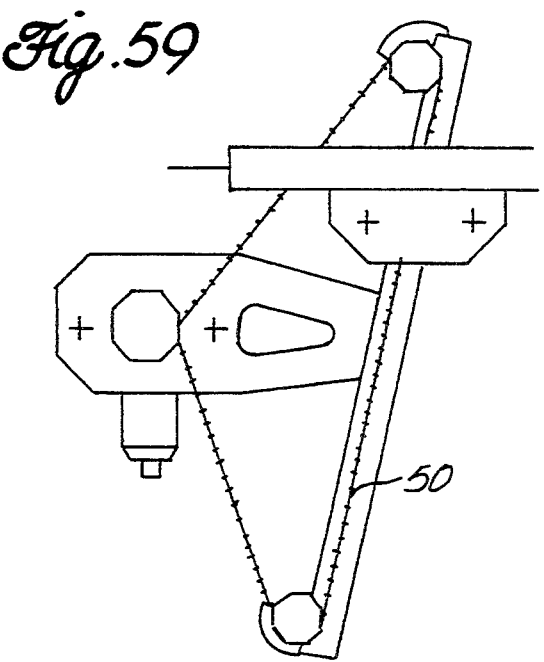
Figure 60:
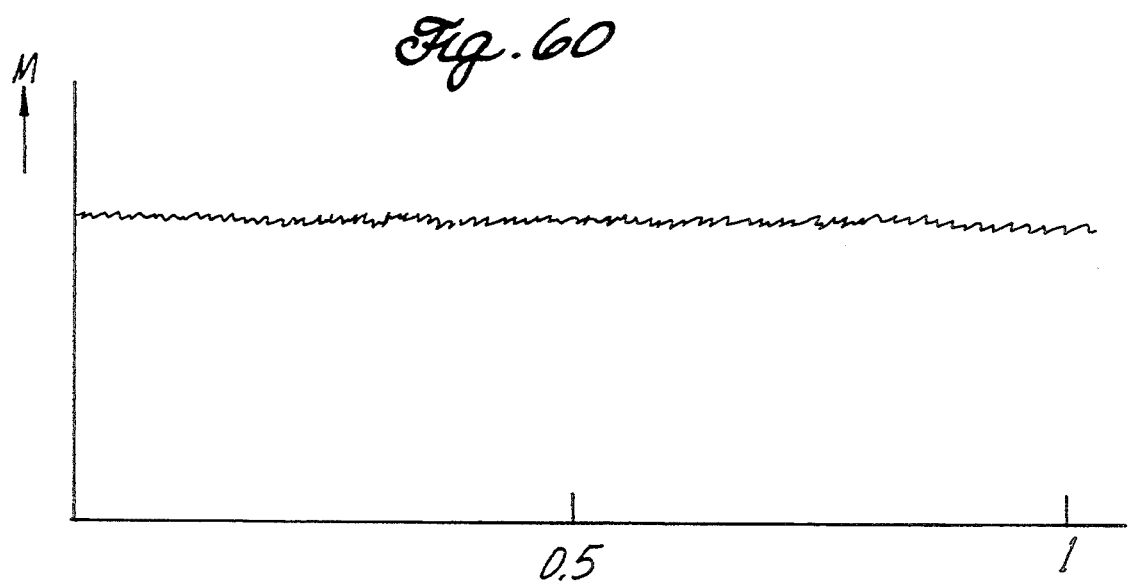

In the case of a window winder with guide rail 47, as shown in FIG. 56, an additional wave form can be produced through the screen pattern 49 of the guide rail 47 with the slide element 48. In other words, a pattern may exist on the guide rail 47 which produces an additional wave form. FIG. 58 shows the friction moment M, the same applies to the cable with the fluting 50 (FIGS. 59 and 60).

In at least one embodiment of the invention, the energy transmission path is designed as a window winder with cable drum 51, cable, guide pulley 53 and guide rail 47, and the guide rail 47 has detents or the cable is ribbed 50.

Figure 61:
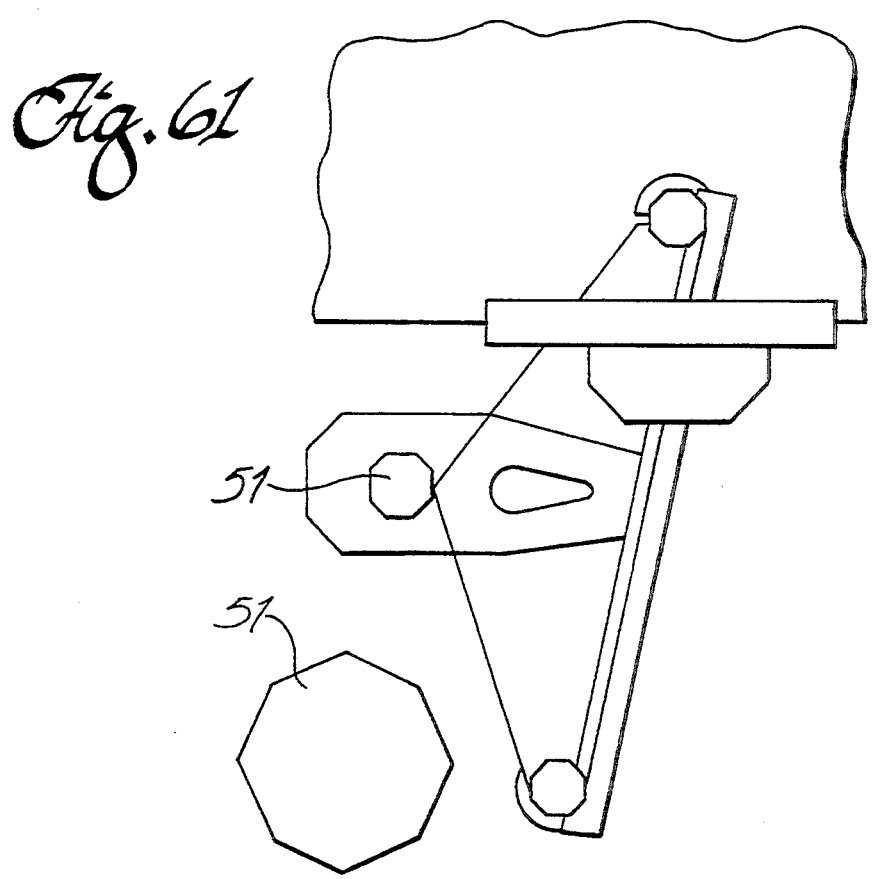
Figure 62:
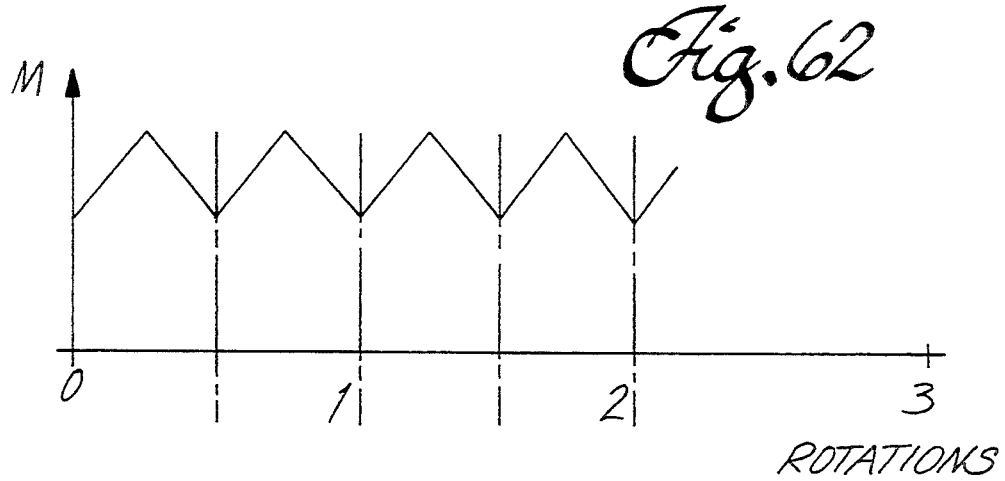
Figure 63:
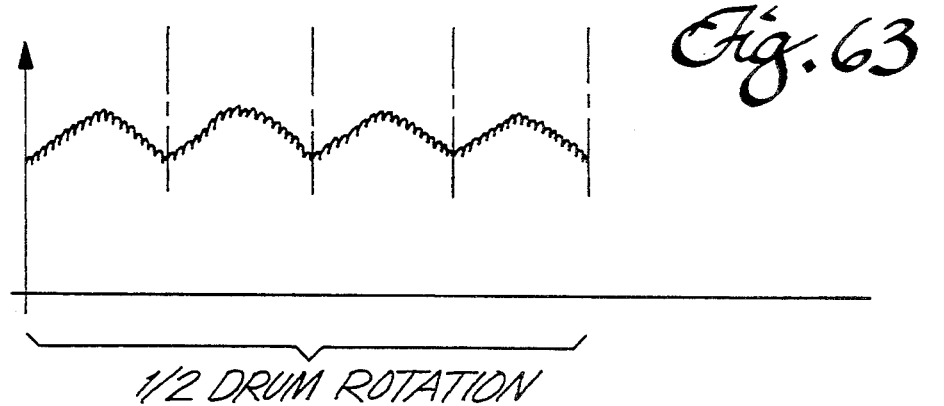
Figure 64:
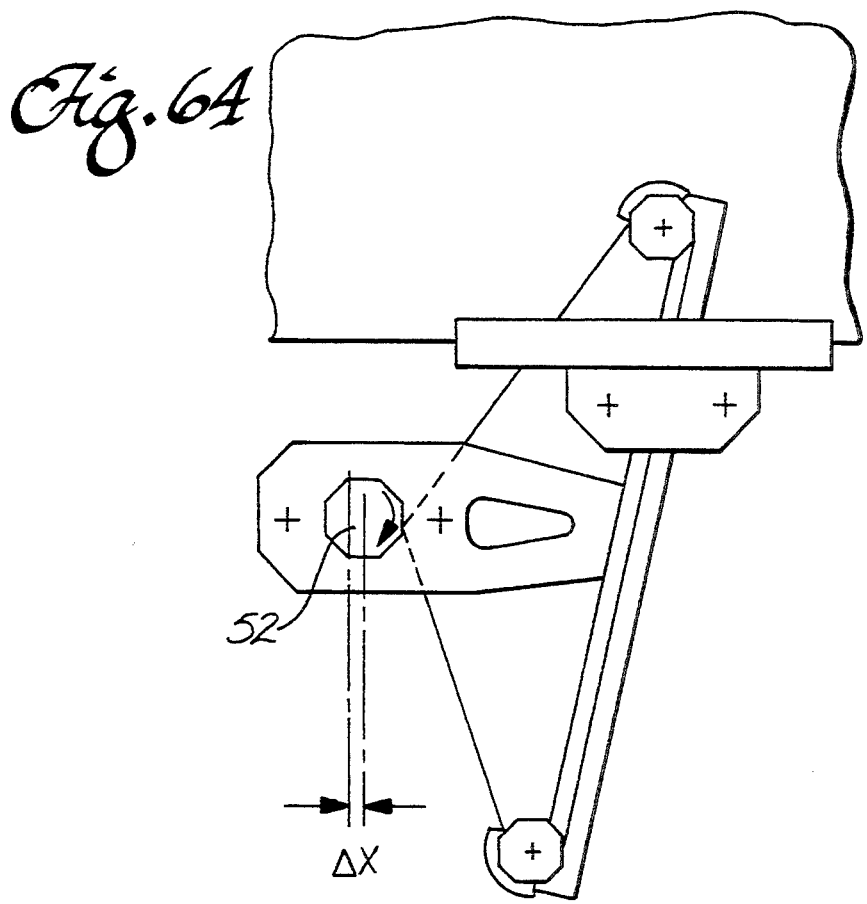
Figure 65:
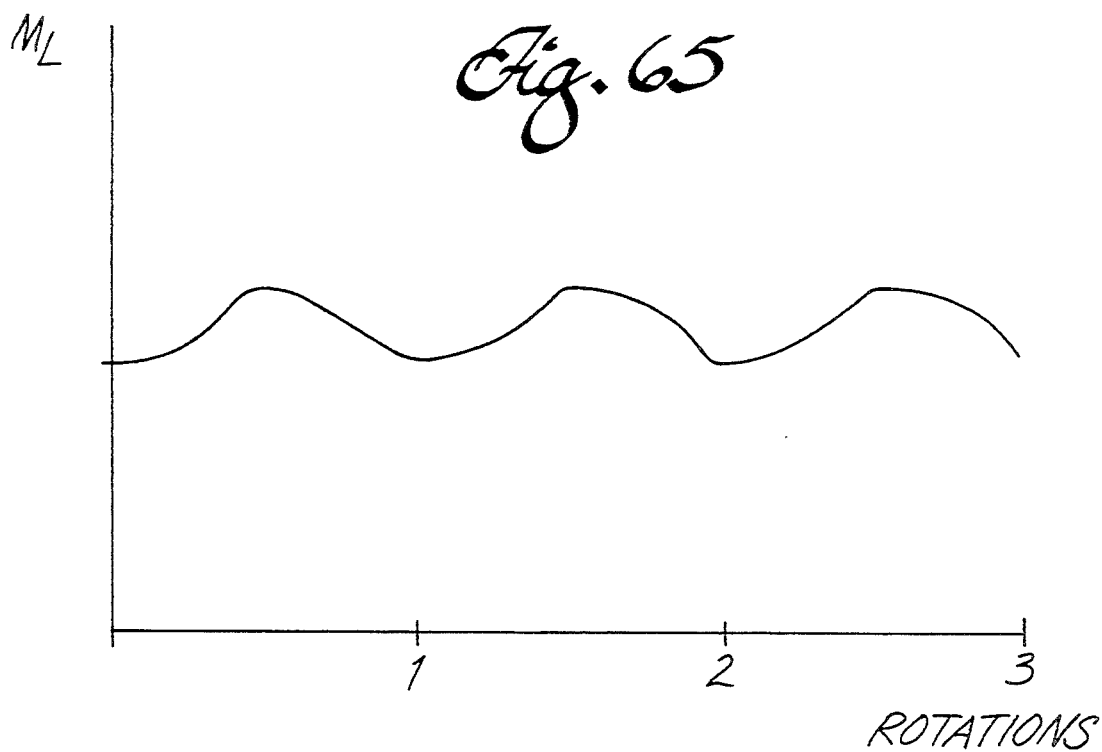

According to FIG. 61 the cable drum 51 is non-circular (octagonal) and in FIG. 64 the cable drum 52 is shifted eccentrically by x. FIGS. 62 and 63 show the corresponding path of the friction moment M and current I respectively and FIG. 65 shows the path of the load moment $M_L$ belonging to FIG. 64. The current path belonging to FIG. 65 is analogous with the curve of the load moment $M_L$, but is overlapped by the wave form signals of substantially shorter periods of the commutator wave form.

Figure 66:
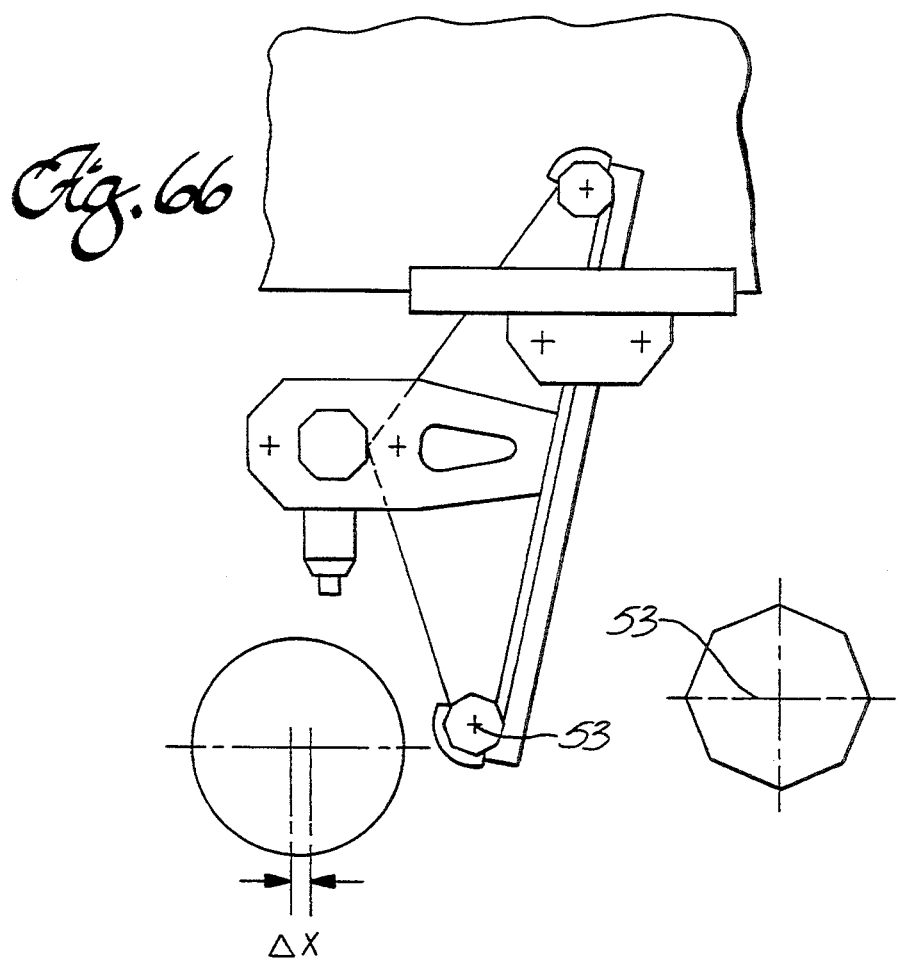

In FIG. 66 the guide pulley 53 is non-circular and can be for example polygonal—octagonal in the present embodiment—or can be shifted off-centre by $\Delta x$ relative to the centre of the pulley, similar to the embodiment according to FIG. 64.

Figure 67:
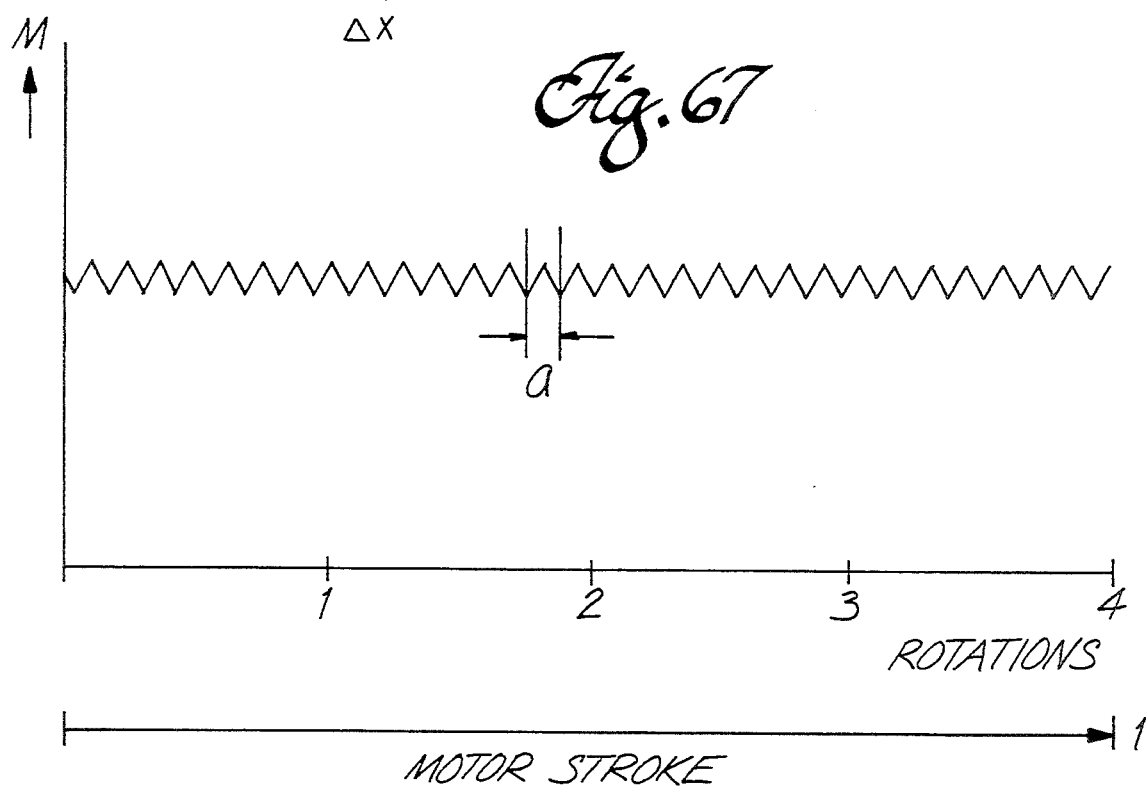

FIG. 67 shows the friction moment M with four revolutions of the guide pulley for a pane lift wherein with this arrangement 64 additional signal changes take place. The correspondingly designed current curve has the superimposed commutator wave form, ie about 30 changes within the period a according to FIG. 67.

Figure 68:
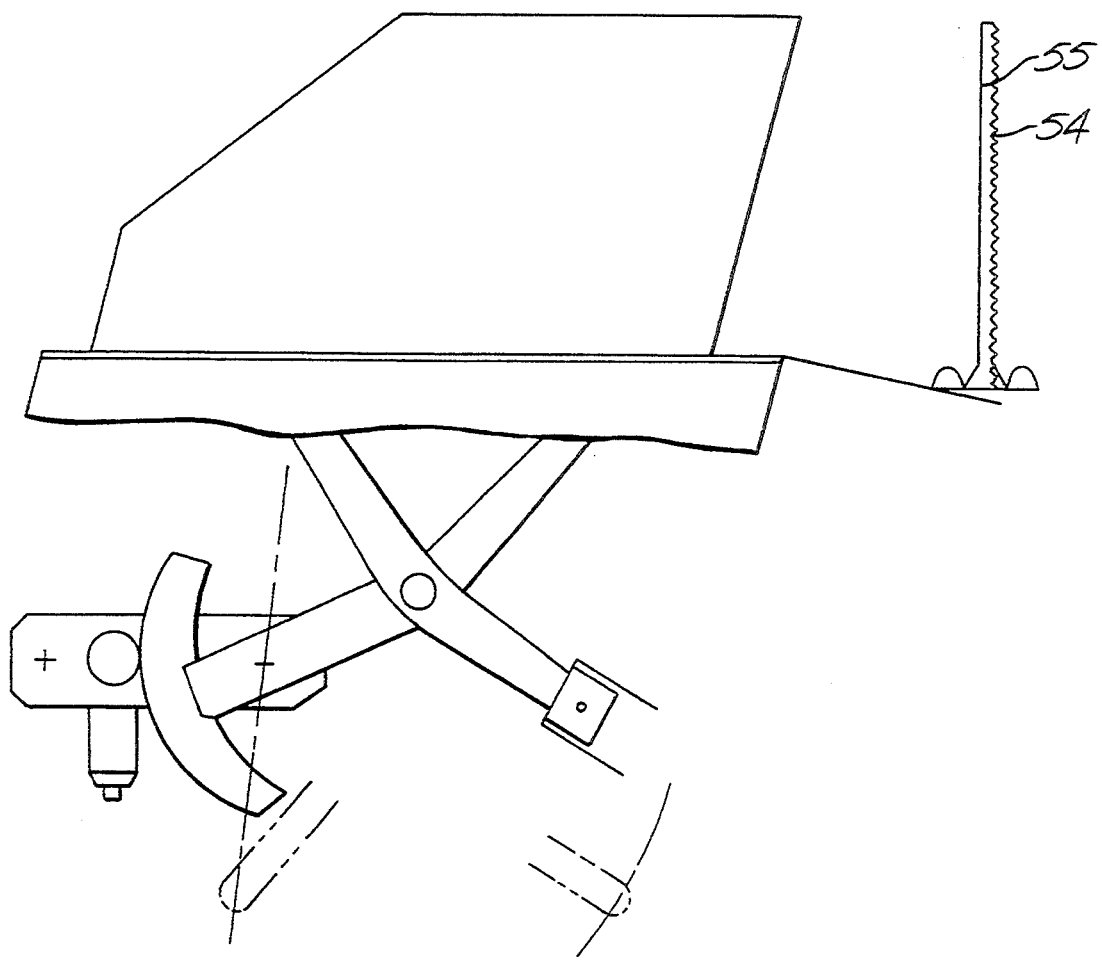
FIGS. 68-71 show examples of mechanical wave form causes in the case of a side pane.
Figure 70:
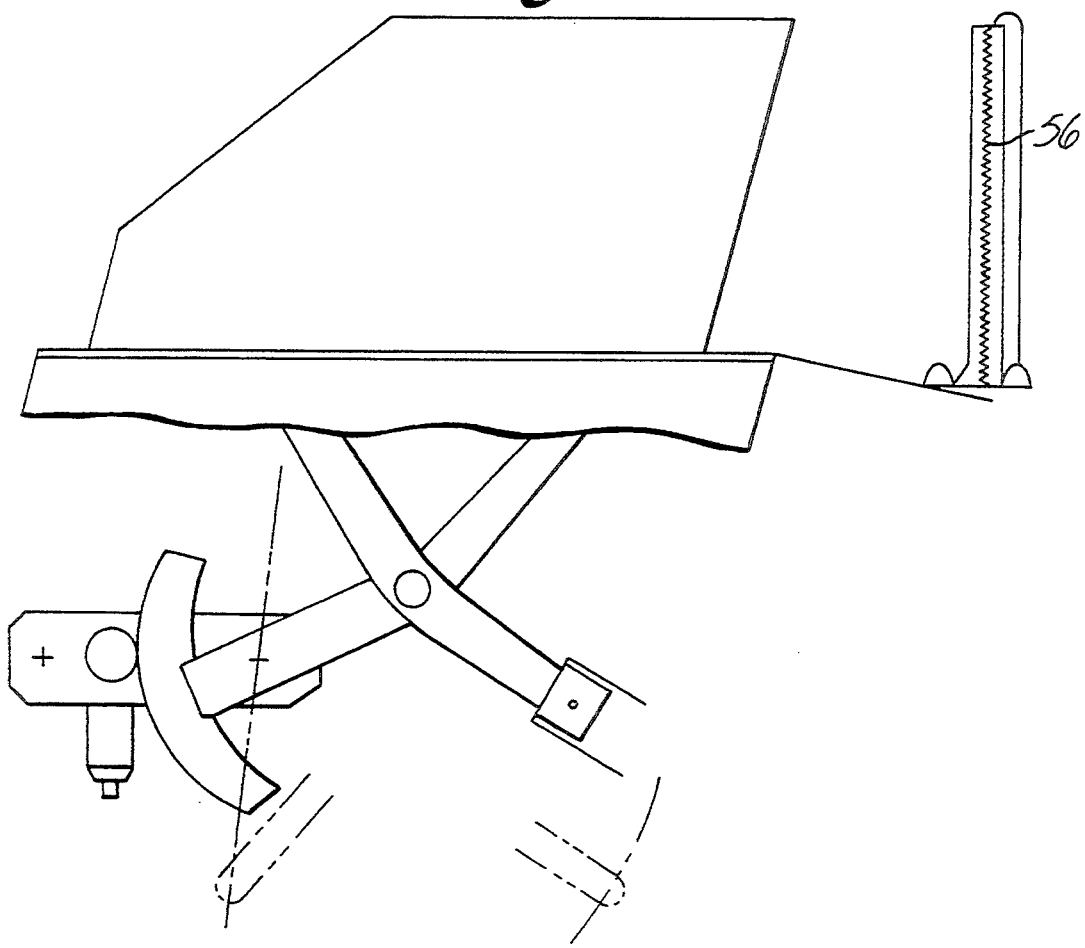
Figure 71:
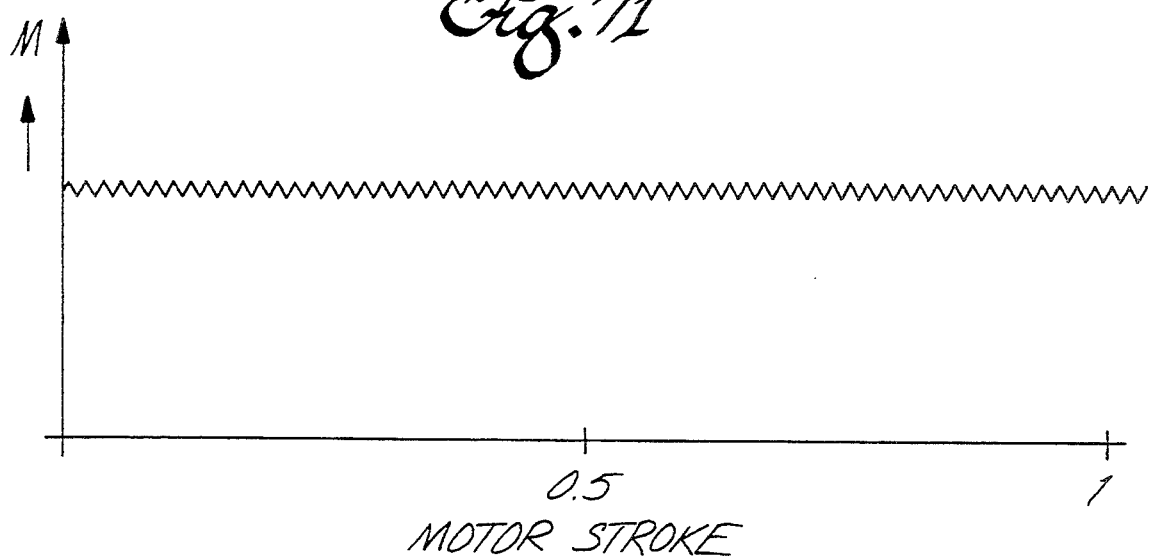

With the arrangements given in FIGS. 68 and 70 the cause of the additional wave form of the signal lies in the flutings 54 of the pane edge 55 according to FIG. 68 or in the flutings in the door seal 56 according to FIG. 70. In both arrangements additional signal changes are obtained corresponding to the screen pattern on the disc or door seal.

Figure 69:
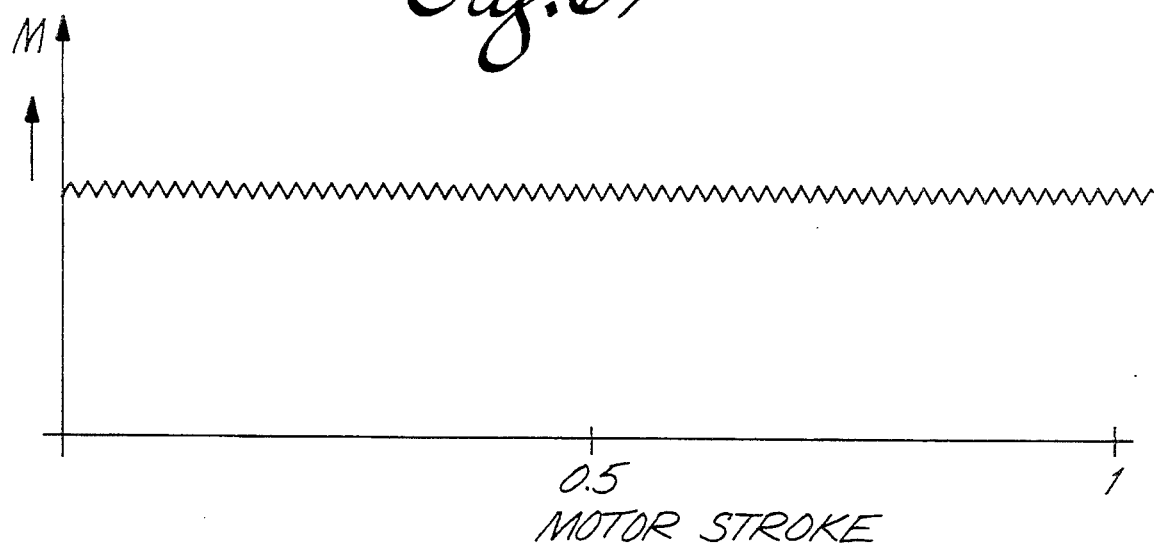

FIGS. 68 and 69 show the corresponding frictions moments M over the route path of the pane, ie over a pane lift. The commutator wave form, for example 1800 changes per pane lift is additionally superimposed on the analog current curve.

Figure 72:
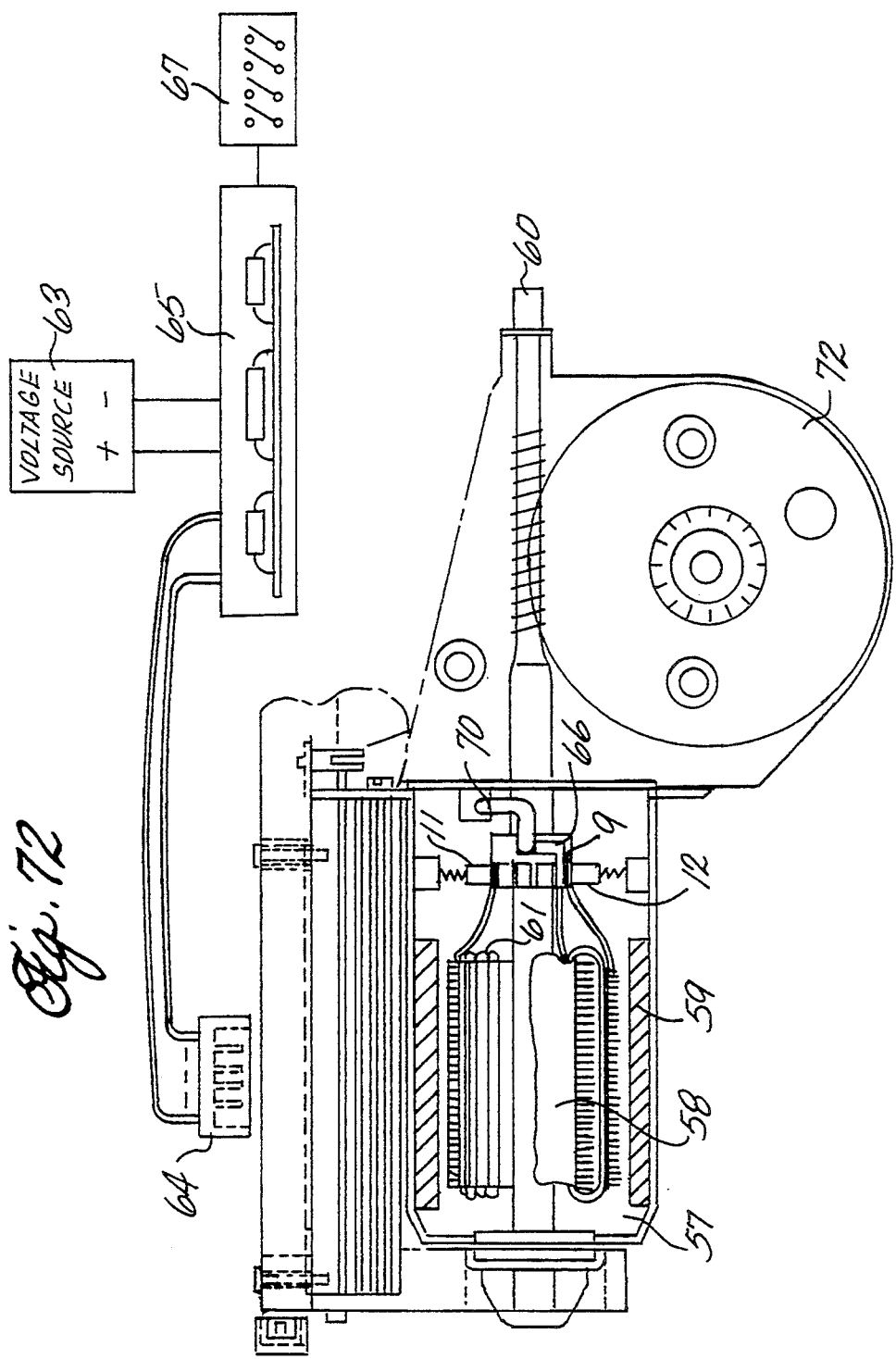
FIG. 72 is a diagrammatic illustration of a brush-fitted commutator for translatory and/or rotary moving assembly parts.

A further design of the invention is described in FIGS. 72 to 81. FIG. 72 shows diagrammatically a commutator motor 57 designed as a direct current motor and provided with a rotor 58 and stator 59. The armature winding 61 of the rotor 68 is in known way connected to the sector-shaped individually insulated bars of a commutator 9 wherein each end of two coil parts of the armature winding 61 is connected to a bar of the commutator 9. The armature current is supplied to the rotor 58 on the circumference of the commutator 9 by brushes 11, 12 which are preferably made of graphite.

As can be seen more clearly in the following Figures, at least one bar of the commutator 9 is connected to at least one electrically conducting scanning track 66 running substantially parallel to the commutator, wherein a scanning element 70 connected to a detector unit is associated with each scanning track 66.

The rotor 58 of the commutator motor is furthermore connected to a motor shaft 60 which in this embodiment is designed as part of a worm gearing. The motor shaft 60 drives the translatory or rotary moving parts of an assembly 72 which consists for example of the gearing of a window winder device in motor vehicles. This gearing converts the rotary movement of the motor shaft 60 into a translatory movement for raising and lowering a window pane.

The commutator motor 57 is connected to a push-in connection 64 which makes connection with a control device 65 which at the same time contains a circuit for detecting the speed, direction of rotation and/or rotary angle position of the electromotor 57 or assembly part 72. From this data arises the position and direction of movement of the adjustable object as well as the speed of displacement. The control device serving to control the motor or armature current furthermore contains a feed circuit attached to the voltage source 63.

The control unit 65 is furthermore connected to a switching unit 67 which has one or more switches with which the movement of the driven assembly parts can be set and released in one or other direction. To this end the switches can consist of rocker or press-button switches which with an initial touch cause the assembly parts to move up to the end stop in one or other direction and then only cause a movement whilst the relevant switch is operated.

The detection of the speed or rotary direction of a commutator motor 57 or of an assembly part mechanically connected therewith will now be described with reference to FIGS. 73 and 74.

Figure 73:
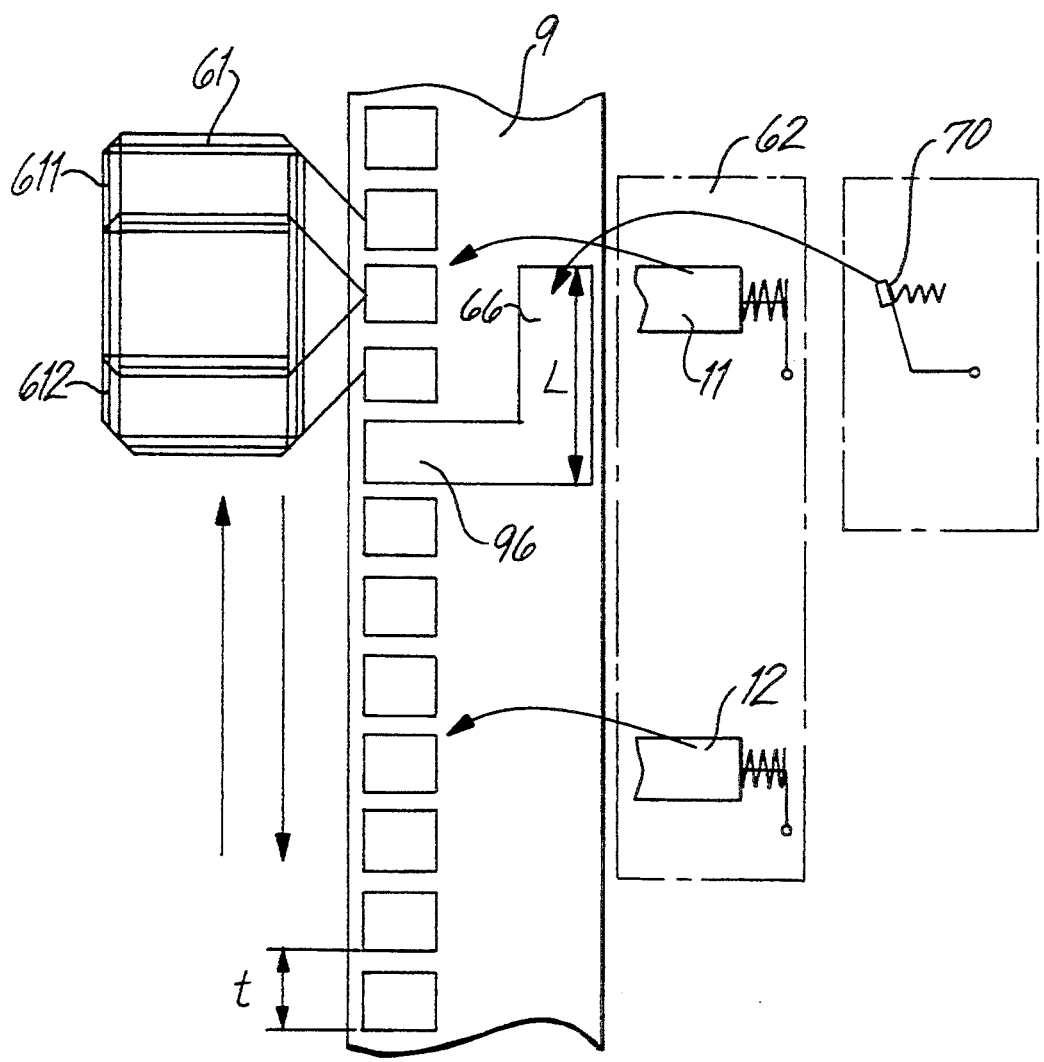
FIG. 73 is a diagrammatic illustration of a wound commutator with an open-ended scanning track running parallel in the circumferential direction.

FIG. 73 diagrammatically illustrates a wound commutator 9 which has for example twelve bars insulated from each other. The bars are connected in the manner previously described to the coil parts of the armature winding 61. The current supply is carried out by two opposing spring-loaded brushes 11, 12 which are mounted in a brush holder 62 which surrounds the commutator 9 in a ring.

One of the commutator bars 96 is connected to an electrically conducting scanning track 66 which runs parallel to the commutator 9 and whose length (L) is greater than the commutator division (t) so that the induced voltages of at least two coil parts of the armature winding 61 are intermittently measured off by means of a sliding contact 70 aligned with the scanning track 66. The detected voltages are thereby related to the mass potential.

Figure 74A:
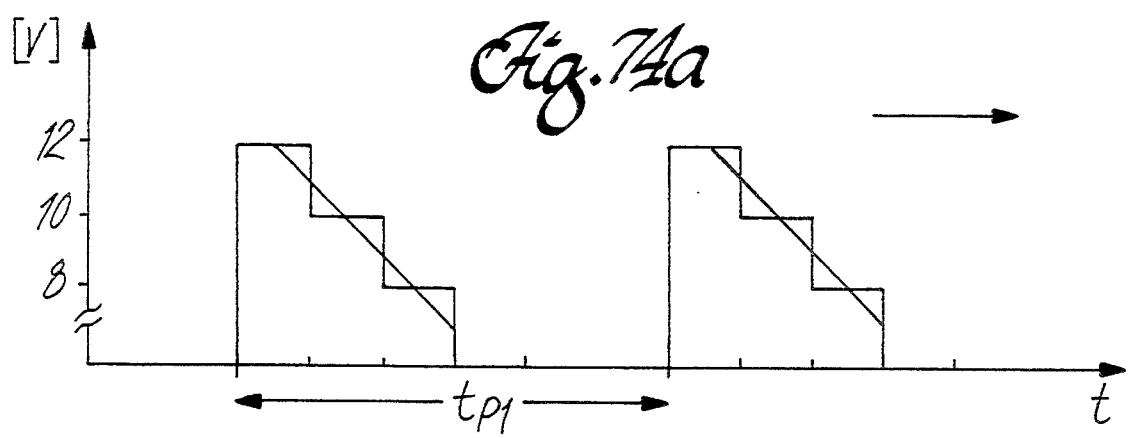
FIG. 74 is a time representation of the voltage paths measured off from the scanning track according to FIG. 73 when the commutator motor runs left and right during motorized operation, FIG. 74 consists of FIGS. 74a and 74b.
Figure 74B:
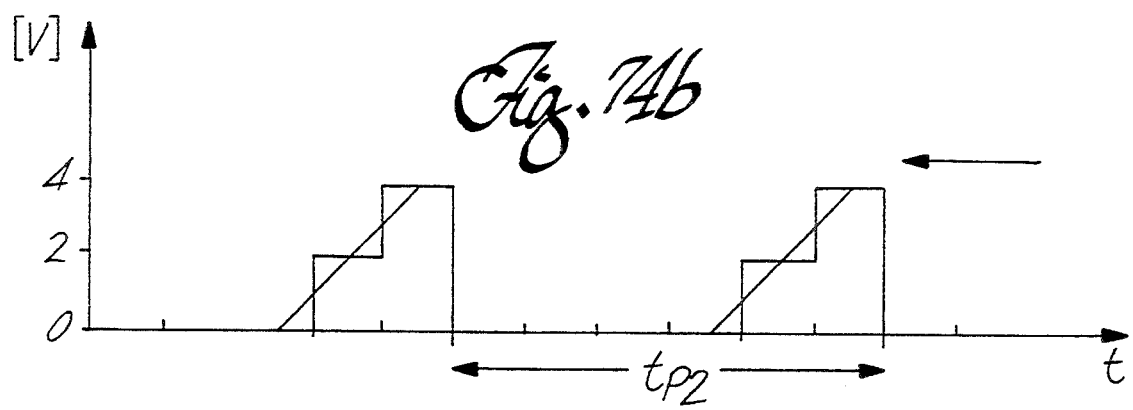

If the length of the scanning track 66 more or less covers the circumference of three commutator bars then during motor operation wherein the torque and rotary direction of the commutator motor run in the same sense, the time voltage paths are produced as shown in FIG. 74.

The voltage path is each time comprised of discrete voltage blocks wherein the dissolution depends on the number of series-connected coil parts of the armature winding 61. It should be recognized that in the running direction given above, which is here marked clockwise, each one revolution produces a decreasing voltage path whilst in the reverse running direction an increasing voltage path is formed.

The rotary direction of the commutator motor 57 or an assembly part driven therewith can clearly be detected from the shape of each voltage path, which is preferably carried out in the signal evaluator unit 4 which will be described in more detail below.

The speed of the commutator motor 57 results from the periodic voltage path whereby each periodic term $t_{p1}$ and $t_{p2}$ are detected for example between the intermittently occurring voltage maxima. the reciprocal value of each periodic term thereby corresponds to the speed of the commutator motor 57.

Figure 75A:
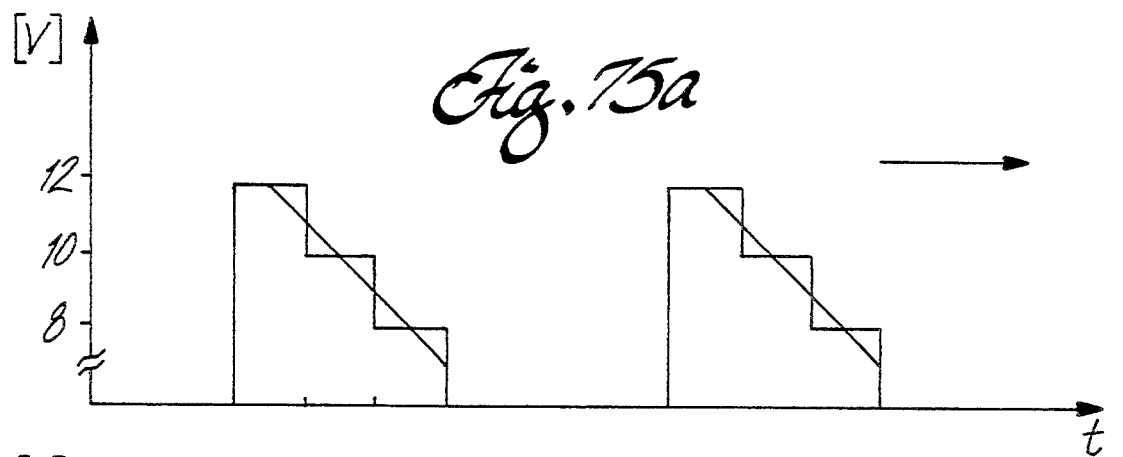
FIG. 75 is a time representation of the voltage paths measured off from the scanning track according to FIG. 73 when the commutator motor runs left and right during generator operation, FIG. 75 consists of FIGS. 75a and 75b.
Figure 75B:

If however the commutator motor 57 is operated generator-wise according to FIG. 73, which occurs for example when lowering a driving load and more particularly when switching off the motor through inertia-conditioned after-run, then with the corresponding running direction of the commutator motor 57 a voltage path is formed which differs from FIG. 75.

If the generator operation occurs for example with an anti-clockwise running of the commutator motor 57 then as shown in FIG. 75 the voltage is reversed with an increasing negative voltage path. The signal evaluator unit 4 connected with the scanning element therefore preferably has switching elements which ascertain the amount of voltage detected each time so that a sudden change in the type of operation of the commutator motor 57 is evaluated by detecting the speed and rotary direction.

Figure 76:
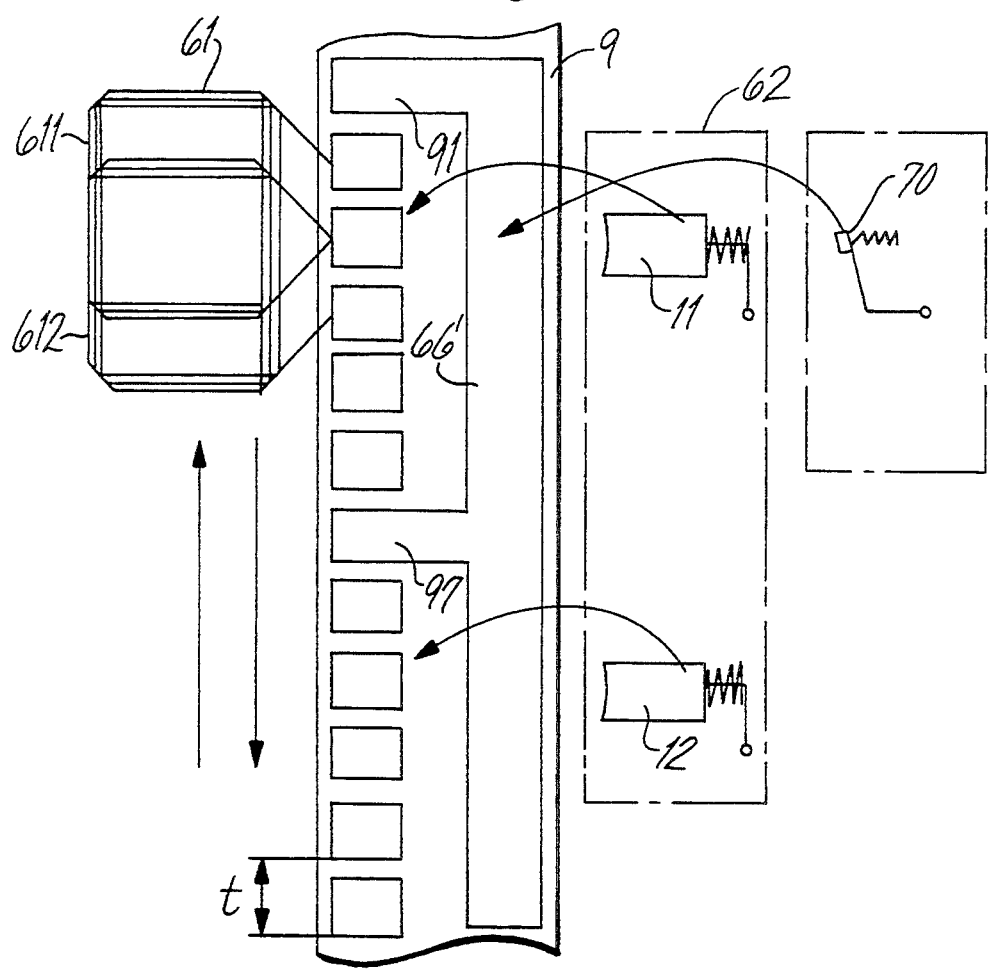
FIG. 76 is a diagrammatic illustration of a wound commutator with a closed scanning track.

FIG. 76 illustrates diagrammatically another embodiment wherein a scanning track 66' connected to commutator bars 91, 97 is mounted next to the illustrated wound commutator bars. The scanning track 66' which is preferably connected to two opposite commutator bars 91, 97 has a maximum loop angle which amounts to approximately 360° wherein the remaining insulation is greater than the scanning face of the sliding contact 70.

So that the motor properties are not significantly affected the closed scanning track 66' has higher ohms than the coil parts of the armature winding 61. The ohmic resistances are preferably in a ratio of $R_s/R_A > 100$ wherein $R_s$ stands for the resistance of the scanning track 66' and $R_A$ for the resistance of a coil part 611, 612 of the armature winding 61.

Figure 77:
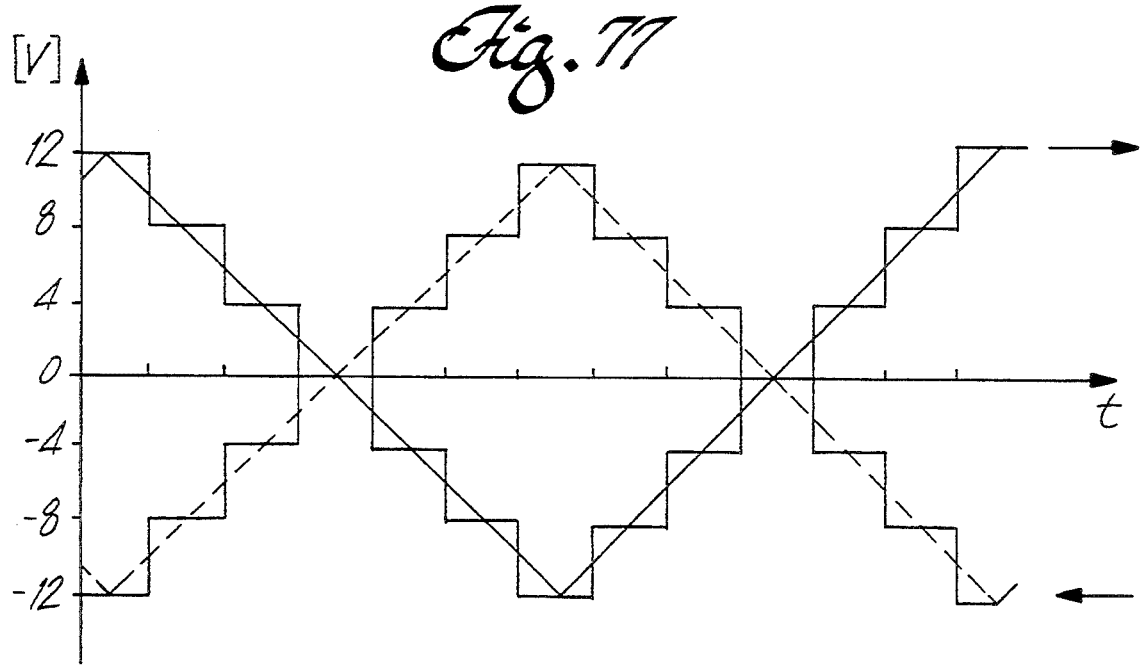
FIG. 77 is a time representation of the voltage paths measured off from the scanning track according to FIG. 76 when the commutator motor runs left and right.

As shown clearly in FIG. 77 the connection of the scanning track to two commutator bars leads to the detection of the difference of the voltages induced in the coil parts of the armature winding 61.

The two voltage paths illustrated for right and left motion make it possible to detect both the speed and rotary angle position as well as the rotary direction of the commutator motor 57. The speed can be detected as in the previous embodiment by means of the period length of the sawtooth-like voltage path. The rotary direction can be evaluated over the length of the scanning track by comparing the momentary values of the detected voltage with the voltage path provided for each turning direction. The rotary angle position can however be determined in each rotary direction by means of the amplitude and signs.

In order to detect the rotary angle position of the commutator motor 57 it is furthermore expedient to use an open-ended scanning track with maximum loop dependence on the scanning surface of the sliding contact. Alternatively it is also expedient to use several open scanning tracks arranged successively in the circumferential direction and each covering for example two bars of the commutator. The rotary angle position can then be detected by means of the voltage amplitude wherein the position of the fixed brushes serves as the reference point.

The accuracy when detecting the rotary angle position is determined as already mentioned above by the number of coil parts of the armature winding connected in series.

FIGS. 78a to 78c show diagrammatically various configurations of the scanning tracks.

FIG. 78a shows in a modified embodiment the circumference of a commutator 9 on which are mounted several scanning tracks 661, 662, 663 which run parallel to each other, are of different length and are connected jointly in an electrically conducting manner to a bar 99. Each of the scanning tracks has its own associated scanning element which is not shown in further detail.

The outer scanning track 663 has a maximum loop angle and preferably serves to detect the rotary angle position. The inner scanning track however only covers four bars and is therefore particularly suitable for detecting the rotary direction.

The commutator 9 illustrated in FIG. 78b is likewise provided with several parallel different length scanning tracks 661', 662', 663' which however are each connected in electrically conducting manner to another bar 95, 97, 99 of the commutator 9. this embodiment has the advantage that in the event of interferences on the scanning track the induced voltages or the measuring values derivable therefrom are still detected by the remaining scanning tracks.

With the embodiment illustrated in FIG. 78c there are three commutator bars and three different length scanning tracks 661″, 666″, 663″ arranged on a common cylindrical body wherein the scanning tracks are mounted one behind the other in the circumferential direction and are each connected to another bar 92, 96, 99.

A single spring-loaded sliding contact is associated with the three scanning tracks 661″, 662″, 663″ whose track length increases and decreases stepwise according to the direction of rotation. The stepped arrangement of the track lengths leads to a coded signal sequence which is dependent on the rotary direction and which allows an additional rotary direction detection next to the increasing or decreasing voltage path.

Figure 79:
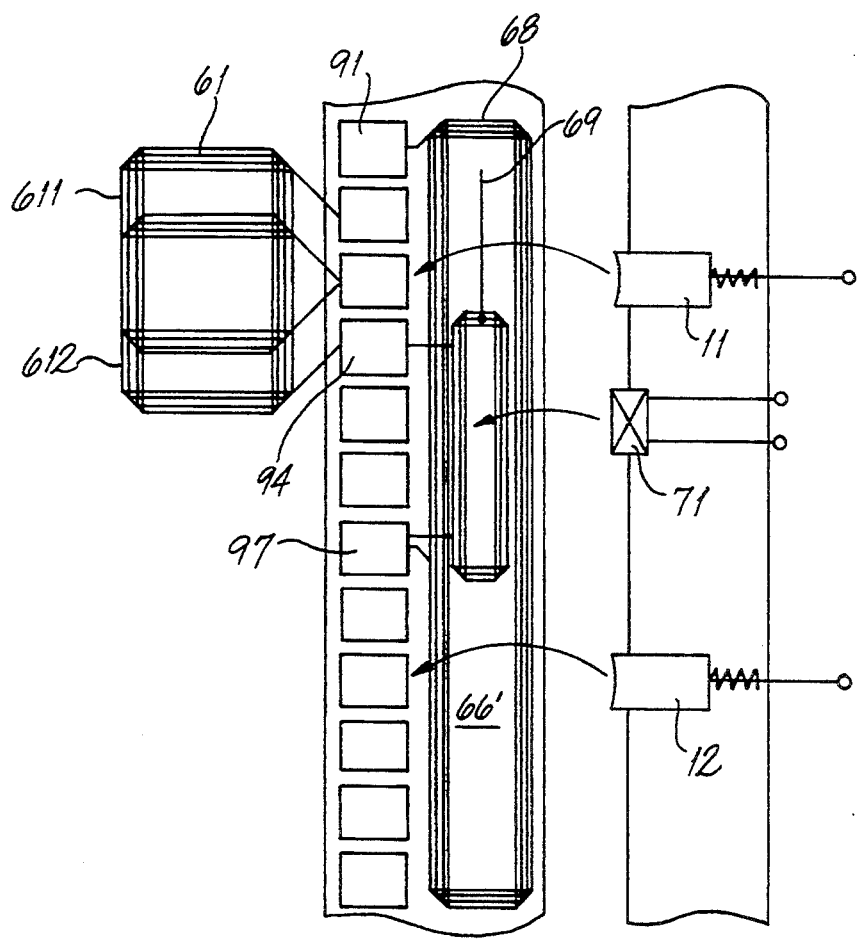
FIG. 79 is a diagrammatic illustration of a wound commutator with a closed scanning track and a voltage detection element set galvanically separated from the scanning track.

FIG. 79 shows diagrammatically a further embodiment of a commutator 9 having two bars. The coil parts 611, 612 of the armature winding 61 and the commutator bars are again shown in the wound form.

The commutator 9 is provided with a scanning track 66″ in which two different length coils 68, 69 are mounted running parallel to the bars. The ends of the larger coil 68 which loops round the commutator 9 with approximately 360° are connected to two opposite bars 91, 97 whilst the ends of the smaller coil 69 which is mounted inside the larger coil 68 are likewise attached to one of these two opposite bars and to a bar 94 in between.

A scanning element is associated with the scanning track 66′ or the two coils 68,69. This scanning element consists of a signal detection element 71 mounted galvanically separated from the scanning track 66′. By way of example an echo sensor can be used in this case as the scanning element 71 wherein this echo sensor detects the signal change in the coil parts of the armature winding 61 of the change in the magnetic field occurring at the coils 68,69, and supplies a corresponding voltage signal.

Figure 80:
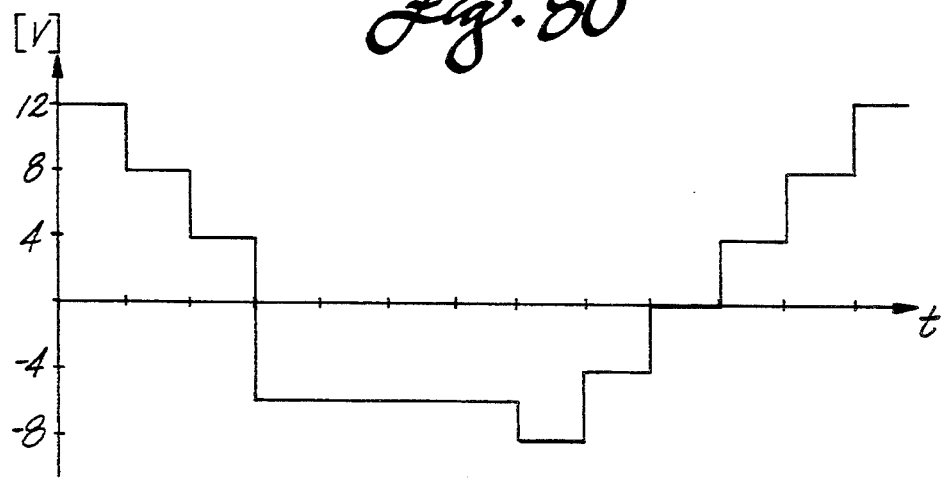
FIG. 80 is a time representation of a signal path detected on the scanning track according to FIG. 79

A possible path of this voltage signal is reproduced in FIG. 80 for the embodiment described here. The connection of the ends of the sensor coils to different bars leads to a differential measurement of the voltages induced in the coil parts of the armature winding. The signal path illustrated in FIG. 80 corresponds to the sum of the magnetic fields owing to the overlapping of the two sensor coils.

By means of a signal path coded in this way it is possible to detect clearly the direction and speed of rotation of the commutator motor. The division of the rotary angle position is comparatively high even if the scanning element 71 detects a constant signal over a rotary angle range of 120°.

FIG. 81 shows in the form of a block circuit diagram a signal evaluator unit 4 for detecting the speed, rotary direction and rotary angle position of a commutator motor.

The signal paths detected over a scanning element are supplied within the signal evaluator unit 4 first to a device 401 for processing a signal where the detected signals are converted for example into sum values so that a voltage change-over which takes place when changing from motor to generator operation does not lead to a faulty evaluation of the signal paths.

Furthermore the device 401 for processing the signals is advantageously provided with active electronic filters with which vibration-conditioned signal interferences are screened.

The signal evaluator unit 4 furthermore retains an evaluator logic 402 which detects from the previously processed signal paths the relevant speed, rotary direction and/or rotary angle position of the commutator motor and which passes this on to the delivery unit 403.

Furthermore the evaluator logic 402 which preferably consists of a microprocessor sends out a switch-off or resetting signal to the control unit 65 of the commutator motor insofar as the detected voltage values or the speed, rotary direction and/or rotary angle position of the commutator motor 57 derived therefrom signal a clamping process or a desired position.

The invention is not restricted in design to the embodiments described above. Indeed a number of variations are conceivable which make use of the solution according to the invention even in the case of designs of a quite different form.

All, or substantially all, of the components and methods of the various embodiments may be used in any combination with at least one embodiment or all of the embodiments, if any, described herein.

All of the patents, patent applications and publications recited herein and in the attached declaration, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

We claim:

1. Process for determining the position and direction of movement as well as the dynamic characteristic values of remote-controlled displacements of an adjustable object by using a position adjustment system;
    wherein a signal is detected and evaluated, the signal comprising a composite of at least two system-characteristic signals, said composite of at least two system-characteristic signals comprising a basic periodicity and at least one signal superimposed on this basic periodicity;
    said adjustable object being a mechanical object;
    said position adjustment system comprising:
        a motor unit; and
        a transmission system which couples said motor unit to said adjustable object for adjusting the position of said adjustable object, said transmission system having component parts which serve to transmit the power necessary to displace said adjustable object;
    said system-characteristic signals being generated exclusively by at least one of:

component parts of the motor unit, said component parts comprising mechanical power generating parts of said motor unit; and component parts of the transmission system which serve to transmit the power necessary to displace said adjustable object;

said system characteristic signals being evaluated by a signal evaluator unit.

2. Process according to claim 1 wherein the signal to be evaluated consists of a system-characteristic basic periodicity and at least one non-periodic analog signal superimposed on this basic periodicity.

3. Process according to claim 1 wherein the signal to be evaluated consists of a system-characteristic basic periodicity and at least one signal superimposed on this basic periodicity and having a period which differs from the basic periodicity.

4. Process according to claim 1 wherein the signal to be evaluated consists of a system-characteristic basic periodicity and at least one signal superimposed on this basic periodicity and having an amplitude differing from the basic periodicity.

5. Process according to claim 1 wherein the signal to be evaluated consists of a system-characteristic basic periodicity and at least one signal superimposed on this basic periodicity and having a phase differing from the basic periodicity.

6. Process according to claim 1 wherein the current wave form of a commutator motor is evaluated as the system-characteristic basic periodicity and in addition to the basic periodicity a periodicity is evaluated which emerges from the production system-conditioned differences of adjoining windings of the commutator motor.

7. Process according to claim 1 wherein the current wave form of a commutator motor is evaluated as a system-characteristic basic periodicity and in addition to the basic periodicity a deliberately produced amplitude modulation of the basic periodicity is evaluated which is formed by changing the impedance of at least one commutator winding.

8. Process according to claim 1 wherein the current wave form of a commutator motor is evaluated as a system-characteristic basic periodicity and in addition to the basic periodicity a deliberately created pulse width modulation is evaluated which arises from an asymmetric division of the commutator bars.

9. Process according to claim 1 wherein the basic periodicity of a pulsating hydraulic pump is evaluated and in addition at least one further system-conditioned or deliberately produced wave form which is produced by pressure fluctuations of the hydraulic system.

10. Process according to claim 1 wherein the signal superimposed on the basic periodicity is based on mechanically conditioned wave forms of an energy transmission path connected to the output of the drive unit, or of the adjustable object, such a transmission path comprising one of: flutings of a window pane edge, detent pattern of a hinge or the tooth sensitivity of gearing parts.

11. Process according to claim 1 wherein the basic periodicity of the voltages induced into the coil parts of the armature winding of a commutator motor is evaluated and at least one system-characteristic signal is superimposed on this basic periodicity, whereby the period of said system-characteristic signal differs from the basic periodicity.

12. Apparatus for detecting the position and direction of movement as well as for detecting dynamic characteristic values of remote-controlled displacements of an adjustable object with a brush-fitted commutator motor and an electronic signal evaluator unit wherein at least one bar of the commutator is connected to at least one electrically conducting scanning track which runs substantially parallel to the commutator and whose length is greater than a division of the commutator and which is designed as part of a circular ring, and that each scanning track has an associated scanning element which is connected to the signal evaluator unit and which detects the momentary value of the voltage of the scanning track.

13. Apparatus according to claim 12, further comprising several scanning tracks of different length and parallel to each other, wherein the scanning tracks are connected with electrical conduction to a bar of the commutator.

14. Apparatus according to claim 12, further comprising several parallel scanning tracks of different length wherein the scanning tracks are each connected with electrical conduction to another bar of the commutator.

15. Apparatus according to claim 12, further comprising several separately arranged scanning tracks.

16. Apparatus for detecting the position and direction of movement as well as for detecting dynamic characteristic values of remote-controlled displacements of an adjustable object with a brush-fitted commutator motor and an electronic signal evaluator unit wherein at least one bar of the commutator is connected to at least one electrically conducting scanning track which runs substantially parallel to the commutator and whose length is greater than a division of the commutator and which is designed as part of a circular ring, the at least one electrically conducting scanning track being closed and being connected additionally to another bar of the commutator, and that each scanning track has an associated scanning element which is connected to the signal evaluator unit and detects the momentary value of the voltage of the scanning track.

17. Apparatus according to claim 16 wherein the ohmic resistance of the scanning track is greater than the ohmic resistance of a coil part of the armature winding of the commutator motor, such that the ratio of the resistances is $R_S/R_A > 100$ wherein $R_S$ stands for the ohmic resistance of the scanning track and $R_A$ for the ohmic resistance of a coil part of the armature winding.

18. Apparatus according to claim 12 or 16 wherein the scanning element consists of a sliding contact aligned with the scanning track or a voltage detection element mounted galvanically separated from the scanning track.

19. Apparatus according to claim 12 or 16 wherein the signal evaluator unit consists of a device for processing signals, an evaluator logic and a device for releasing a signal for the rotary direction, speed and rotary angle position of the commutator motor.

20. Apparatus for detecting the position and direction of movement as well as for detecting the dynamic characteristic values of remote-controlled displacements of an adjustable object with an adjustment system and an electronic signal evaluator unit wherein the electronic signal evaluator unit evaluates a signal, said signal having a system-characteristic basic periodicity and at least one system-characteristic signal superimposed on this basic periodicity, and said electronic signal evaluator unit producing a correlation of the two signals from which the position, direction of movement and dynamic characteristic values are determined;

said adjustable object being a mechanical object;
said adjustment system comprising:
a motor unit; and
a transmission system which couples said motor unit to said adjustable object for adjusting the position of said adjustable object, said transmission system having component parts which serve to transmit the power necessary to displace said adjustable objects;
said system characteristic signals being generated exclusively by at least one of:
component parts of the motor unit, said component parts comprising mechanical power generating parts of said motor unit; and
component parts of the transmission system which serve to transmit the power necessary to displace said adjustable object.

21. Apparatus according to claim 20, wherein:
said motor unit comprises a commutator motor;
said commutator motor comprises a commutator, said commutator comprising commutator segments;
said component parts of the motor unit for generating said system-characteristic signals comprising one of:
the commutator segments of the commutator being mounted asymmetrically; and
the commutator having an eccentricity.

22. Apparatus according to claim 20, wherein:
said motor unit comprises a commutator motor;
said commutator motor comprises a commutator;
said component parts of the motor unit for generating said system-characteristic signals comprising:
an additional slip ring on said commutator, said additional slip ring being partially covered by brushes, said additional slip ring having bars covering at least two parts of the actual commutator, said additional slip ring having an ohmic load.

23. Apparatus according to claim 20, wherein:
said motor unit comprises a commutator motor;
said commutator motor comprising brushes;
said component parts of the motor unit for generating said system-characteristic signals comprising one of:
the brushes of the commutator motor being arranged at an angle other than 180° relative to each other; and
an additional third brush adjoining the commutator segments.

24. Apparatus according to claim 20, wherein:
said motor unit comprises a commutator motor;
said commutator motor comprises brushes;
said component parts of the motor unit for generating said system-characteristic signals comprising at least one brush of the commutator motor being mounted for tilting movement and at the same time having a non-homogeneous conductivity in the circumferential direction.

25. Apparatus according to claim 20, wherein:
said motor unit comprises a commutator motor;
said component parts of the motor unit for generating said system-characteristic signals comprising one or more capacities connected in parallel to one of:
the commutator motor; and
suppressor throttles, the suppressor throttles being connected in series with the commutator motor.

26. Apparatus according to claim 20, wherein:
said motor unit comprises a commutator motor;
said commutator motor comprises a motor winding;
said component parts of the motor unit for generating said system-characteristic signals comprising one of:
the motor winding of the commutator motor varying by one or more windings; and
the motor winding of the commutator motor having different length parts conditioned by the position of the windings.

27. Apparatus according to claim 20, wherein:
said motor unit comprises a commutator motor;
said component parts of the motor unit for generating said system-characteristic signals comprising:
asymmetric permanent magnets being used for the commutator motor; and
the permanent magnets of the commutator motor being installed in the tilted position.

28. Apparatus according to claim 20, wherein:
said motor unit comprises a commutator motor;
said commutator motor comprising permanent magnets;
said component parts of the motor unit for generating said system-characteristic signals comprising a magnetic material with continuously radially changing magnetic induction being used for the permanent magnets of the commutator motor.

29. Apparatus according to claim 20, wherein:
said motor unit comprises a commutator motor;
said transmission system comprises an armature;
said component parts of the transmission system for generating said system-characteristic signals comprising one of:
the armature of the commutator motor having a sheet metal armature section which has different magnetic resistances in dependence on the angular position; and
the armature of the commutator motor being pre-magnetized in a forwardly attracting direction.

30. Apparatus according to claim 20, wherein:
said motor unit comprises a commutator motor;
said transmission system comprises an armature shaft and a worm wheel, said armature shaft comprising a worm;
said component parts of the transmission system for generating said system-characteristic signals comprising one of:
the worm of the armature shaft of the commutator motor having an uneven worm pitch;
the worm wheel having an uneven pitch; and
the armature shaft of the commutator having a radial imbalance.

31. Apparatus according to claim 20, wherein:
said motor unit comprises a commutator motor;
said transmission system comprises one of:
a shaft and a plastics mushroom for mounting or supporting said shaft; and
an armature shaft and an armature shaft bearing;
said component parts of the transmission system for generating said system-characteristic signals comprising one of:
the plastics mushroom having a wavy screen pattern; and
different friction values being produced on the circumference of the armature shaft bearing of the commutator.

32. Apparatus according to claim 20, wherein:
said motor unit comprises a commutator motor;
said transmission system comprises a drive pinion;

said component parts of the transmission system for generating said system-characteristic signals comprising one of:
the drive pinion having a radial imbalance; and
the drive pinion having an uneven module.

33. Apparatus according to claim 20, wherein:
said motor unit comprises a pulsating hydraulic pump;
said transmission system comprises a pressure chamber and a hydraulic pipe;
said component parts of the transmission system for generating said system-characteristic signals comprising:
said pressure chamber being mounted behind the hydraulic pump in the hydraulic pipe and being biased with a periodic pressure exciter signal.

34. Apparatus according to claim 20, wherein:
said motor unit comprises a pulsating hydraulic pump;
said transmission system comprises a hydraulic system, said hydraulic system including fluid;
the fluid of the hydraulic system is one of:
an electro-rheological fluid; and
a ferro-fluid;
said component parts of the transmission system for generating said system-characteristic signals comprising:
the fluid being deliberately penetrated by a periodically fluctuating electric or magnetic field.

35. Apparatus according to claim 20, wherein:
said motor unit comprises a pulsating hydraulic pump;
said transmission system comprises a hydraulic drive assembly; and
the hydraulic drive assembly is designed in the form of a gear rod driven by a gearwheel.

36. Apparatus according to claim 20, wherein:
said transmission system comprises an energy transmission path designed as a window winder with pinion, tooth segment and hinge; and
said component parts of the transmission system for generating said system-characteristic signals comprising one of:
the engagement between the pinion and toothed segment being designed with a characteristic tooth sensitivity; and
the hinge having a detent pattern.

37. Apparatus according to claim 20 wherein:
said transmission system comprises an energy transmission path designed as a window winder with cable drum, cable, guide pulley and guide rail; and
said component parts of the transmission system for generating said system-characteristic signals comprising one of:
the cable drum being non-circular or eccentric; and
the guide pulley being non-circular or eccentric.

38. Apparatus according to claim 20 wherein:
said transmission system comprises an energy transmission path designed as a window winder with cable drum, cable, guide pulley and guide rail; and
said component parts of the transmission system for generating said system-characteristic signals comprising one of:
the guide rail having detents; and
the cable is ribbed.

39. Apparatus according to claim 20, wherein:
a window pane is the adjustable object;
said transmission system comprises an edge of the window pane and a door seal;
said component parts of the transmission system for generating said system-characteristic signals comprising one of:
the pane edge of the window pane having flutings; and
the door seal having flutings.

* * * * *